US006959687B2

(12) United States Patent
Iizuka et al.

(10) Patent No.: US 6,959,687 B2
(45) Date of Patent: Nov. 1, 2005

(54) SOHC TYPE ENGINE

(75) Inventors: Yoshiaki Iizuka, Wako (JP); Junji Yamano, Wako (JP); Toshio Abe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/475,520

(22) PCT Filed: Apr. 19, 2002

(86) PCT No.: PCT/JP02/03947

§ 371 (c)(1),
(2), (4) Date: Apr. 22, 2004

(87) PCT Pub. No.: WO02/095206

PCT Pub. Date: Nov. 28, 2002

(65) Prior Publication Data

US 2005/0172940 A1 Aug. 11, 2005

(30) Foreign Application Priority Data

May 17, 2001 (JP) ............................ 2001-148375
May 17, 2001 (JP) ............................ 2001-148376
May 17, 2001 (JP) ............................ 2001-148511

(51) Int. Cl.[7] .......................... F02P 15/02; F02B 23/08

(52) U.S. Cl. .................. 123/310; 123/90.27; 123/308; 123/432

(58) Field of Search ............................ 123/90.27, 308, 123/310, 432

(56) References Cited

U.S. PATENT DOCUMENTS 4,116,179 A 9/1978 Nagumo et al. ............ 123/310
4,116,181 A * 9/1978 Nakajima et al. ........... 123/310
6,615,796 B2 * 9/2003 Iizuka et al. ................ 123/310

FOREIGN PATENT DOCUMENTS

JP 60-10165 8/1977
JP 10-148113 6/1998

* cited by examiner

*Primary Examiner*—Tony M. Argenbright
(74) *Attorney, Agent, or Firm*—Armstrong, Kratz, Quintos, Hanson & Brooks, LLP

(57) ABSTRACT

An SOHC-type engine in which first and second insertion/removal guide sections for guiding the insertion and removal of first and second spark plugs, respectively, are provided on a cylinder head including an intake valve and the first spark plug disposed therein and arranged along an axis of a camshaft, and an exhaust valve and the second spark plug disposed therein and arranged along the axis of the camshaft.

20 Claims, 13 Drawing Sheets

SOHC TYPE ENGINE

FIELD OF THE INVENTION

The present invention relates to an SOHC-type engine and particularly, to an SOHC-type engine in which first and second insertion/removal guide sections for guiding the insertion and removal of first and second spark plugs, respectively, are provided on a cylinder head including an intake valve and a first spark plug disposed therein and arranged along an axis of a camshaft, and an exhaust valve and a second spark plug disposed therein and arranged along the axis of the camshaft.

BACKGROUND ART

Conventionally, such engine is already known from Japanese Patent Publication No. 60-10165 and the like, for example.

In the conventional SOHC-type engine, a pair of rocker shafts are disposed on opposite sides of and above the camshaft, and an intake-side rocker arm moved following an intake-side cam on the camshaft to drive the intake valves is swingably carried on one of the rocker shafts, and an exhaust-side rocker arm moved following an exhaust-side cam on the camshaft to drive the exhaust valves is swingably carried on the other rocker shaft. Therefore, the width of the cylinder head in a direction perpendicular to the camshaft is obliged to become relatively large.

DISCLOSURE OF THE INVENTION

The present invention has been accomplished with such circumstances in view, and it is an object of the present invention to provide an SOHC-type engine, wherein the width of the cylinder head in the direction perpendicular to the axis of the camshaft can be set to be small.

To achieve such object, according to a first aspect and feature of the present invention, there is provided an SOHC-type engine in which first and second insertion/removal guide sections for guiding the insertion and removal of first and second spark plugs, respectively, are provided on a cylinder head including an intake valve and a first spark plug disposed therein and arranged along an axis of a camshaft, and an exhaust valve and a second spark plug disposed therein and arranged along the axis of the camshaft, wherein a single rocker shaft is disposed above the camshaft; an intake-side rocker arm moved following an intake-side cam provided on the camshaft to drive the intake valve and an exhaust-side rocker arm moved following an exhaust-side cam provided on the camshaft to drive the exhaust valve are carried commonly on the rocker shaft; the first insertion/removal guide section and the intake valve are disposed so as to be superposed one on another at least partially in a view of projection onto a plane perpendicular to the axis of the camshaft; and the second insertion/removal guide section and the exhaust valve are disposed so as to be superposed one on another at least partially in a view of projection onto the plane.

With such arrangement of the first feature, the intake valve and the first insertion/removal guide section as well as the exhaust valve and the second insertion/removal guide section can be disposed at locations closer to the camshaft and hence, the width of the cylinder head in the direction perpendicular to the axis of the camshaft can be set to be small, as compared with the conventional SOHC-type engine including the pair of rocker shafts.

According to a second aspect and feature of the present invention, in addition to the arrangement of the first feature, the shortest distance in the projection view between at least one of the first and second insertion/removal guide sections and the camshaft is set smaller than the shortest distance in the projection view between at least one of valve stems of the intake and exhaust valves and the camshaft. With such arrangement, at least one of the first and second insertion/removal guide sections can be disposed in more proximity to the camshaft, whereby the width of the cylinder head in the direction perpendicular to the axis of the camshaft can be set to be smaller.

According to a third aspect and feature of the present invention, in addition to the arrangement of the first feature, the shortest distance in the projection view between the first insertion/removal guide section and the camshaft is set smaller than the shortest distance in the projection view between the valve stem of the intake valve and the camshaft, and the shortest distance in the projection view between the second insertion/removal guide section and the camshaft is set smaller than the shortest distance in the projection view between the valve stem of the exhaust valve and the camshaft. With such arrangement, both of the first and second insertion/removal guide sections can be disposed in more proximity to the camshaft, whereby the width of the cylinder head in the direction perpendicular to the axis of the camshaft can be set to be further small.

According to a fourth aspect and feature of the present invention, in addition to any of the first to third features, at least one of upper ends of the first and second insertion/removal guide sections is formed, curved to protrude into a valve-operating chamber defined between the cylinder head and a head cover coupled to the cylinder head. With such arrangement, the amount of projection of the upper end of at least one of the first and second insertion/removal guide sections from the side of the cylinder head can be suppressed to a small value, thereby contributing to setting at the small value the width of the cylinder head in the direction perpendicular to the axis of the camshaft, and enhancing the rigidity of a sidewall of the cylinder head. Moreover, the inclination of at least one of the first and second spark plug can be suppressed to a small value to enhance the ignitability.

According to a fifth aspect and feature of the present invention, in addition to the arrangement of any of the first to fourth features, at least an upper portion of the first insertion/removal guide section is formed to have an arcuate cross-sectional shape opened in a direction opposite from the camshaft. With such arrangement, it is easy to form the cylinder head by casting.

According to a sixth aspect and feature of the present invention, in addition to the arrangement of any of the first to fifth features, at least one of the first and second insertion/removal guide sections is disposed at least partially between each of head bolts for fastening the cylinder head to a cylinder block at locations spaced apart from one another along the axis of the camshaft and at least one of the intake and exhaust valves. With such arrangement, at least one of the first and second insertion/removal guide sections can be disposed at least partially and effectively in a space between at least one of the intake and exhaust valves and the head bolt disposed sideways thereof, thereby providing the further compactness of the cylinder head.

According to a seventh aspect and feature of the present invention, in addition to the arrangement of any of the first to sixth features, at least one of the first and second insertion/removal guide sections is disposed at least partially between a shaft bearing portion provided on the cylinder head to carry the camshaft thereon for rotation and at least one of the intake and exhaust valves. With such arrangement, at least one of the first and second insertion/removal guide sections can be disposed at least partially and effectively in a space between at least one of the intake and exhaust valves and the shaft bearing portion disposed sideways thereof, thereby providing the further compactness of the cylinder head.

According to an eighth aspect and feature of the present invention, in addition to the arrangement of any of the first to seventh features, the first and second insertion/removal guide sections are formed to protrude toward the valve-operating chamber at locations corresponding to contact potions of the intake-side and exhaust-side cams immersed partially in an oil bath defined on the cylinder head and the intake-side and exhaust-side rocker arms. With such arrangement, one of the intake-side and exhaust-side cams causes an oil in the oil bath to be scattered by the rotation thereof to collide against a portion of one of the first and second insertion/removal guide sections, which protrudes toward the valve-operating chamber, whereby the oil can be scattered into the valve-operating chamber. Moreover, the oil colliding against the portions of the first and second insertion/removal guide sections protruding toward the valve-operating chamber can be further scattered toward the intake-side cam and the exhaust-side cam, whereby the oil can be supplied efficiently to the contact portions of the intake-side and exhaust-side cams and the intake-side and exhaust-side rocker arms to enable the effective lubrication.

According to a ninth aspect and feature of the present invention, in addition to the arrangement of the first feature, at least an upper end of the second insertion/removal guide section is formed into a cylindrical shape, and bolts for fastening a head cover to the cylinder head are disposed between the second insertion/removal guide sections individually corresponding to a plurality of combustion chambers. With such arrangement, a portion provided on the cylinder head in order to fasten the head cover of the multi-cylinder engine to the cylinder head can be disposed so as not to protrude sideways from the side of the cylinder head to the utmost, thereby further contributing to the compactness of the cylinder head.

According to a tenth aspect and feature of the present invention, in addition to the arrangement of the first feature, a first plug holder connected to the first spark plug inserted into the first insertion/removal guide section protrudes from the cylinder head; an ignition coil connected to an upper end of the first spark plug holder are fastened to a head cover coupled to the cylinder head by a single coil bolt; and a detent portion is integrally provided on the head cover to come into contact with the upper end of the first plug holder in order to receive a load around the axis of the coil bolt acting on a protrusion of the first plug holder from the cylinder head during tightening of the coil bolt. With such arrangement, the ignition coil can be mounted to the head cover by a very simple mounting operation and moreover, a forcible load can be prevented from acting on the ignition plug, while avoiding an increase in number of parts. In addition, the rigidity of the head cover can be enhanced by the detent portion.

According to an eleventh aspect and feature of the present invention, in addition to the arrangement of the tenth feature, bolts for fastening the head cover to the cylinder head are disposed between the detent portions individually corresponding to a plurality of combustion chambers. With such arrangement, a portion provided on the cylinder head to fasten the head cover to the cylinder head can be disposed so as not to protrude sideways from the side of the cylinder head to the utmost, thereby further contributing to the compactness of the cylinder head and providing a reduction in weight of the cylinder head.

According to a twelfth aspect and feature of the present invention, in addition to the arrangement of the tenth or eleventh feature, each of the detent portions is formed into a ring shape. With such arrangement, the rigidity of the head cover can be further enhanced.

According to a thirteenth aspect and feature of the present invention, in addition to the arrangement of any of the tenth to twelfth features, a fastening boss for fastening the ignition coil is provided on the head cover inside the detent portion. With such arrangement, it is possible to avoid an increase in size of the head cover due to the fastening of the ignition coil.

According to a fourteenth aspect and feature of the present invention, in addition to the arrangement of any of the tenth to thirteenth features, a resilient member is mounted between the detent portion and the first plug holder. With such arrangement, the transmission of the vibration of the engine to the ignition coil can be moderated and hence, the durability of the ignition coil can be maintained at a high level.

According to a fifteenth aspect and feature of the present invention, in addition to the arrangement of the first feature, upper end faces of the first and second insertion/removal guide sections are formed in the same plane, and a head cover is coupled to the upper end faces of the first and second insertion/removal guide sections. With such arrangement, the upper end faces of the first and second insertion/removal guide sections can be worked simultaneously, leading to a good workability.

According to a sixteenth aspect and feature of the present invention, in addition to the arrangement of the first feature, an upper portion of the first insertion/removal guide section, into which the first plug holder connected to the first spark plug is inserted, is formed to have an arcuate cross-sectional shape opened forwards in a direction of forward movement of the vehicle. With such arrangement, travel wind generated with the forward movement of the vehicle strikes directly against the first plug holder to effectively cool the first plug holder.

According to a seventeenth aspect and feature of the present invention, in addition to the arrangement of the first feature, an upper portion of the first insertion/removal guide section is formed to have an arcuate cross-sectional shape opened in a direction opposite from the camshaft, and a boss for mounting a fuel injection valve is provided on the cylinder head at a location adjoining a lower portion of the first insertion/removal guide section in a direction along the axis of the camshaft. With such arrangement, it is easy to form the cylinder head by casting, and moreover, the fuel injection valve can be disposed in more proximity to the first spark plug, while avoiding the interference with the first insertion/removal guide section, thereby contributing to the compactness of the engine.

According to an eighteenth aspect and feature of the present invention, in addition to the arrangement of the first feature, a boss for mounting a fuel injection valve is provided on the cylinder head so as to be integrally connected at no distance to the first insertion/removal guide section. With such arrangement, the rigidity of the boss can be enhanced.

According to a nineteenth aspect and feature of the present invention, in addition to the arrangement of the first feature, the second insertion/removal guide section, the intake-side rocker arm, the intake valve and a boss provided on the cylinder head in order to mount the fuel injection valve are disposed substantially side by side on the same plane perpendicular to the axis of the camshaft. With such arrangement, the cylinder head can be formed further compactly.

According to a twentieth aspect and feature of the present invention, in addition to the arrangement of the first feature, a protrusion is integrally provided on the cylinder head to project outwards and sideways from the cylinder block; a spark plug chamber faced by a portion of the first spark plug is defined in the cylinder head in such a manner that a portion of the spark plug chamber is disposed on the protrusion; and a drainage bore is provided in the protrusion, so that one end thereof opens into a lower portion of the spark plug chamber and the other end thereof opens into an outer surface of a lower portion of the protrusion. With such arrangement, the volume of the spark plug chamber can be set at a relatively large value to provide a reduction in weight of the cylinder head, and water entering into the spark plug chamber can be discharged reliably by the drainage bores shortened in length and simplified.

BRIEF DESCRIPTION OF THE DRAWINGS

FIG. 1 is a vertical sectional view of an upper portion of an engine, taken along a line 1—1 in FIG. 3;

FIG. 2 is a vertical sectional view of the upper portion of the engine, taken along a line 2—2 in FIG. 3;

FIG. 3 is across-sectional view of a cylinder head, taken along a line 3—3 in FIG. 2;

FIG. 4 is a plan view taken along a line 4—4 in FIG. 1 for showing the arrangement in a valve-operating chamber;

FIG. 5 is a side view of the cylinder head, taken in the direction of an arrow 5 in FIG. 4;

FIG. 6 is a bottom view of the cylinder head, taken in the direction of an arrow 6 in FIG. 5;

FIG. 7 is a sectional view of the cylinder head, taken along a line 7—7 in FIG. 3;

FIG. 8 is a plan view taken in the direction of an arrow 8 in FIG. 1;

FIG. 9 is a plan view of the entire arrangement of a head cover;

FIG. 10 is a view for explaining the flowing of an EGR gas among an intake-side fastening face of the cylinder head, a gasket and a plate;

FIG. 11 is a sectional view taken along a line 11—11 in FIG. 5;

FIG. 12 is a view of a cooling water system showing the flowing of cooling water when the engine is cold; and FIG. 13 is a view of the cooling water system showing the flowing of cooling water when the engine is hot.

BEST MODE FOR CARRYING OUT THE INVENTION

Figure 1:
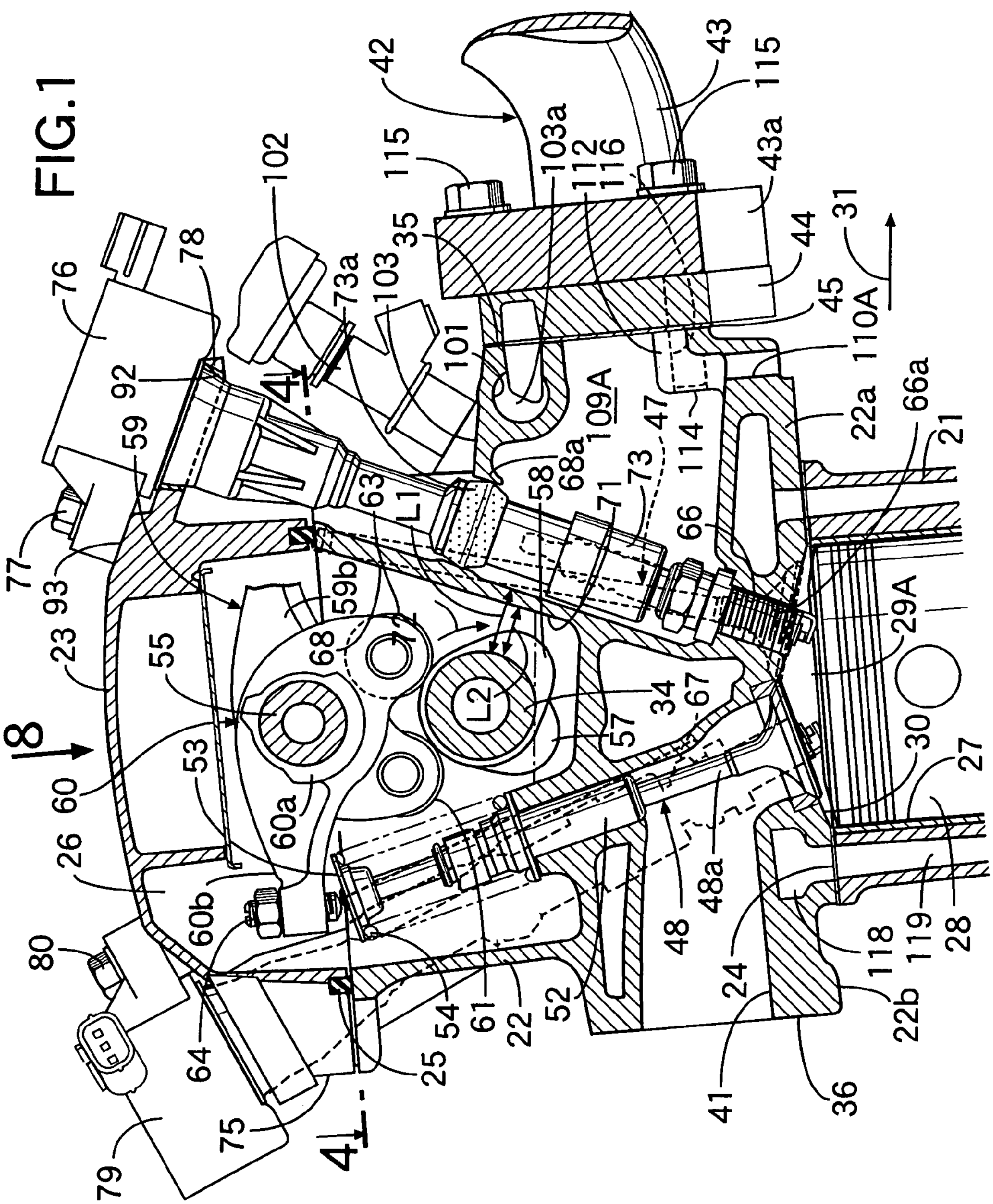
FIGS. 1 to 13 show an embodiment of the present invention.

Referring first to FIGS. 1 to 6, an engine is a multi-cylinder, e.g., 4-cylinder SOHC-type engine. The engine is mounted in a vehicle and includes a cylinder block 21, a cylinder head 22 fastened to an upper surface of the cylinder block 21 through a gasket 24, and a head cover 23 fastened to an upper surface of the cylinder head 22 through a gasket 25 and defining a valve-operating chamber 26 between the head cover 23 and the cylinder head 22.

Four cylinder bores 27 are provided in the cylinder block 21 and arrange in line in a lateral direction perpendicular to a direction 31 of forward movement of the vehicle, and recesses 30 are provided in a lower surface of the cylinder head 22 and arranged in line to define first, second, third and fourth combustion chambers 29A, 29B, 29C and 29D between the recesses 30 and the cylinder block 21, respectively, so that tops of pistons 28 slidably received in the cylinder bores 27 face the combustion chambers 29A, 29B, 29C and 29D, respectively.

Figure 7:
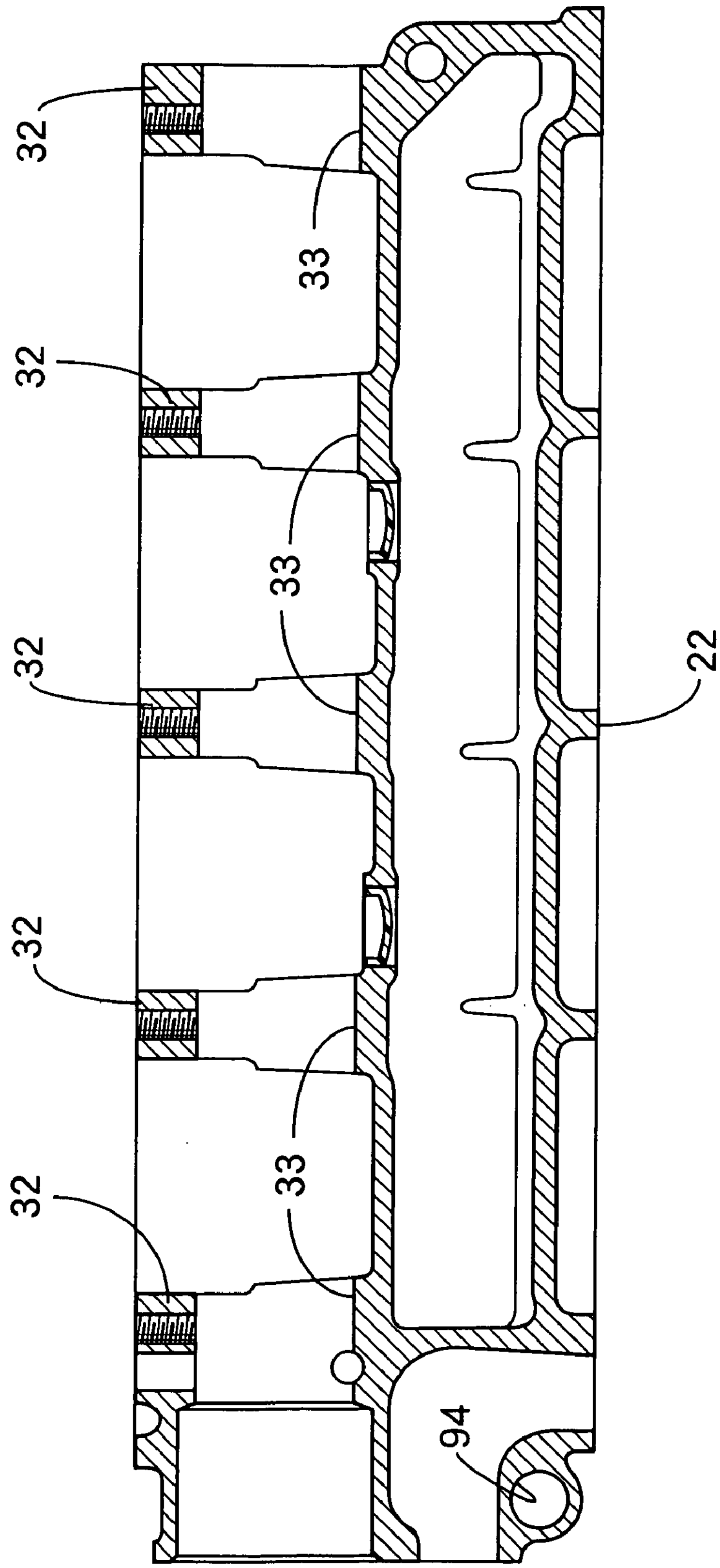

Referring also to FIG. 7, five shaft bearing portions 32 are integrally provided at an upper portion of the cylinder head 22 at a substantially central location in a direction perpendicular to a direction of arrangement of the first to fourth combustion chambers 29A to 29D in such a manner that the first to fourth combustion chambers 29A to 29D are interposed therebetween, and circular bearing bores 33 are provided coaxially in the shaft bearing portions 32. On the other hand, A camshaft 34 having an axis extending in parallel to the direction of arrangement of the first to fourth combustion chambers 29A to 29D is disposed in the valve-operating chamber 26 above the combustion chambers 29A to 29D and rotatably carried on the shaft bearing portions 32. Specifically, five circular support portions 34*a* are integrally provided on the camshaft 34 at locations axially spaced apart from one another and in correspondence to the shaft bearing portions 32 to protrude radially outwards, and are inserted through and supported in the bearing bores 33, whereby the camshaft 34 is rotatably carried on the cylinder head 22.

Protrusions 22*a* and 22*b* are integrally provided on opposite sides of the cylinder head 22 commonly to the combustion chambers 29A to 29D to project outwards from the cylinder block 21. One 22*a* of the protrusions 22*a* and 22*b*, which faces forwards in the direction 31 of forward movement of the vehicle, is formed at its outer end with an intake-side fastening face 35 which is a flat face parallel to the camshaft 34, and the other protrusion 22*b* facing backwards in the direction 31 of forward movement of the vehicle is formed at its outer end with an exhaust-side fastening face 36 as a flat face parallel to the camshaft 34.

Intake ports 40 and exhaust ports 41 are provided in the cylinder head 22 one by one for each of combustion chambers 29A to 29D. Outer ends of the intake ports 40 open into the intake-side fastening face 35, and outer ends of the exhaust ports 41 open into the exhaust-side fastening face 36.

An intake device 42 is fastened to the intake-side fastening face 35 and includes an intake manifold 43 having a flange 43*a* common to the intake ports 40, and a plate 44 put into abutment against the flange 43*a* and having passages 46 individually corresponding to the intake ports 40. The intake device 42 is fastened to the intake-side fastening face 35 in such a manner that a gasket 45 is interposed between the plate 44 and the intake-side fastening face 35. In addition, an exhaust device (not shown) is fastened to the exhaust-side fastening face 36.

Intake valves 47 are openably and closably disposed in the cylinder head 22 and interposed between inner ends of the intake ports 40 and the combustion chambers 29A to 29D, and exhaust valves 48 are also openably and closably disposed in the cylinder head 22 and interposed between inner ends of the exhaust ports 41 and the combustion chambers 29A to 29D.

Each of the intake valves 47 has a valve stem 47*a*, which is slidably received in a guide tube 49 provided in the cylinder head 22 to protrude into the valve-operating chamber 26, and the intake valve 47 is biased into a closing direction by a valve spring 51 mounted under compression between a retainer 50 mounted at an upper end of the valve stem 47*a* and the cylinder head 22. Each of the exhaust valves 48 has a valve stem 48*a*, which is slidably received in a guide tube 52 provided in the cylinder head 22 to protrude into the valve-operating chamber 26, and the exhaust valve 48 is biased into a closing direction by a valve spring 54 mounted under compression between a retainer 53 mounted at an upper end of the valve stem 48*a* and the cylinder head 22.

A single rocker shaft 55 having an axis parallel to the camshaft 34 is disposed in the valve-operating chamber 26 and fixed to the cylinder head 22 above the camshaft 34. Specifically, the rocker shaft 55 is fastened by bolts 56 to upper surfaces of the shaft bearing portions 32 provided on the cylinder head 22 to carry the camshaft 34 for rotation.

The intake valves 47 and the exhaust valves 48 for every combustion chamber 29A to 29D are disposed at locations displaced from one another along the axes of the camshaft 34 and the rocker shaft 55. Intake-side cams 57 corresponding to the intake valves 47 and exhaust-side cams 58 corresponding to the exhaust valves 48 are integrally provided on the camshaft 34 for every combustion chamber 29A to 29D. A radius of a circular locus described by each of tops of the intake-side cams 57 and the exhaust-side cams 58 is set smaller than a radius of the support portion 34*a* included in the camshaft 34, whereby the camshaft 34 can be inserted through and supported in the shaft-bearing portions 32 of the cylinder head 22.

Swingably carried on the rocker shaft 55 are intake-side rocker arms 59 moved following the intake-side cams 57 on the camshaft 34 to drive the intake valves 47, and exhaust-side rocker arms 60 moved following the exhaust-side cams 58 on the camshaft 34 to drive the exhaust valves 48.

Each of the intake-side rocker arms 59 includes a cylindrical boss portion 59*a* swingably carried on the rocker shaft 55, and an arm portion 59*b* extending in a direction perpendicular to the axis of the rocker shaft 55 and integrally connected to the boss portion. A roller 61 pivotally supported at one end of the arm portion 59*b* is in rolling contact with the intake-side cam 57, and a tappet screw 62, which is threadedly engaged with the other end of the arm portion 59*b* so that its advanced/retracted position can be adjusted, is in abutment against an upper end of the valve stem 47*a* of the intake valve 47.

The exhaust-side rocker arm 60 includes a cylindrical boss portion 60*a* swingably carried on the rocker shaft 55, and an arm portion 60*b* extending in a direction perpendicular to the axis of the rocker shaft 55 and integrally connected to the boss portion 60*a*. A roller 63 pivotally supported at one end of the arm portion 60*b* is in rolling contact with the exhaust-side cam 58, and a tappet screw 64, which is threadedly engaged with the other end of the arm portion 60*b* so that its advanced/retracted position can be adjusted, is in abutment against an upper end of the valve stem 48*a* of the exhaust valve 48.

The intake-side rocker arm 59 and the exhaust-side rocker arm 60 are swingably mounted on the rocker shaft 55 in such a manner that a spring 65 surrounding the rocker shaft 55 is interposed between the boss portions 59*a* and 60*a* of the rocker arms 59 and 60, and the axial movement of the boss portions 59*a* and 60*a* are restricted by the shaft bearing portions 32 of the cylinder head 22, and the positioning of the intake-side rocker arm 59 and the exhaust-side rocker arm 60 in a direction along the axis of the rocker shaft 55 can be performed by the single spring 65, leading to a reduction in number of parts, as compared with a case where springs are interposed between the rocker shaft 55 and the shaft bearing portions 32.

The boss portions 59*a* and 60*a* are formed to extend from the arm portions 59*b* and 60*b* toward the shaft bearing portions 32 to come into sliding direct contact with the shaft bearing portions 32. By utilizing such structure, the number of parts can be reduced, as compared with a structure in which collars are interposed between the boss portions 59*a* and 60*a* and the shaft bearing portions 32.

The arm portions 59*b* and 60*b* interposed between the intake-side cam 57 as well as the exhaust-side cam 58 and the intake valve 47 as well as the exhaust valve 48 are formed to extend in the direction perpendicular to the axis of the rocker shaft 55. Therefore, as compared with a case where arm portions are curved, the rigidity of the arm portions 59*b* and 60*b* on which a valve-operating load is applied can be enhanced, and the size of a space required for placement of the intake-side rocker arm 59 and the exhaust-side rocker arm 60 in the direction along the axis of the camshaft 34 can be suppressed to a small value, which can contribute to a reduction in size of the cylinder head 22 in the direction along the axis of the camshaft 34.

First and second spark plugs 66 and 67 with their axes disposed in a plane perpendicular to the axis of the camshaft 34 are disposed in the cylinder head 22 in correspondence to the first to fourth combustion chambers 29A to 29D in such a manner that they are threadedly fitted into threaded bores 66*a* and 67*a* provided in the cylinder head 22. The first spark plugs 66 arranged side by side with the exhaust valves 48 in the direction perpendicular to the axis of the camshaft 34 are disposed so as to be arranged side by side with the intake valves 47 along the axis of the camshaft 34, and the second spark plugs 67 arranged side by side with the intake valves 47 in the direction perpendicular to the axis of the camshaft 34 are disposed so as to be arranged side by side with the exhaust valves 48 along the axis of the camshaft 34.

In other words, the first spark plugs 66 arranged side by side with upstream ends of the exhaust ports 41 in the direction perpendicular to the axis of the camshaft 34 are disposed so as to be arranged side by side with the intake valves 47 along the axis of the camshaft 34, and the second spark plugs 67 arranged side by side with downstream ends of the intake ports 40 in the direction perpendicular to the axis of the camshaft 34 are disposed so as to be arranged side by side with the exhaust valves 48 along the axis of the camshaft 34. The upstream end of each of the intake ports 40 is disposed offset to one side from a downstream end of the intake port 40 in the direction along the axis of the camshaft 34, and a downstream end of each of the exhaust ports 41 is disposed offset to the other side from the upstream end of the exhaust port 41 in the direction along the axis of the camshaft 34.

By determining the disposition of the intake and exhaust ports 40 and 41 and the first and second spark plugs 66 and 67, as described above, a flow of intake air from each of the intake ports 40 produces a swirl flow in each of the combustion chambers 29A to 29D to enhance the combustion efficiency, while ensuring areas of the downstream ends of the intake ports 40 opening into the combustion chambers 29A to 29D and areas of the upstream ends of the exhaust ports 41 opening into the combustion chambers 29A to 29D at large values to the utmost.

Moreover, the intake ports 40 and the exhaust ports 41 are provided in a curved fashion in the cylinder head 22, so that a position PI of a central portion of the upstream end, i.e., a central portion of the outer end of each of the intake ports 40 and a position PO of a central portion of the downstream end, i.e., a central portion of the outer end of each of the exhaust ports 41 coincide with each other in the direction along the axis of the camshaft 34.

First insertion and removal guide portions 68 for guiding the insertion and removal of the first spark plugs 66 are integrally provided on the cylinder head 22 for every combustion chamber 29A to 29D, and second insertion and removal guide portions 69 for guiding the insertion and removal of the second spark plugs 67 are integrally provided on the cylinder head 22 for every combustion chamber 29A to 29D.

Each of the first insertion/removal guide sections 68 is formed so as to have an arcuate cross-sectional shape opened in a direction opposite from the camshaft 34 (forwards in the direction 31 of forward movement of the vehicle) at least at its upper portion, e.g., at its upper and lower portions excluding its vertically intermediate portion in the present embodiment. Therefore, the formation of the cylinder head 22 by casting is facilitated by defining the shape of the first insertion/removal guide section 68 in the above manner. Each of the second insertion/removal guide sections 69 is integrally provided on the cylinder head 22 with at least its upper end, e.g., the entire region in the present embodiment being formed cylindrically.

Upper end faces of the first and second insertion/removal guide sections 68 and 69 are formed in the same plane, and the head cover 23 is fastened to the upper end faces of the first and second insertion/removal guide sections 68 and 69 with the gasket 25 interposed therebetween. With such a construction, the upper end faces of the first and second insertion/removal guide sections 68 and 69 can be worked simultaneously, leading to an improved workability.

Referring particularly carefully to FIG. 1, the first insertion/removal guide section 68 and the intake valve 47 are disposed so as to be superposed one on another at least partially in a view of projection onto a plane perpendicular to the axis of the camshaft 34, and the second insertion/removal guide section 69 and the exhaust valve 48 are disposed so as to be superposed one on another at least partially in a view of projection onto such plane. Moreover, the shortest distance in the projection view between at least one (both in the present embodiment) of the first and second insertion/removal guide sections 68 and 69 and the camshaft 34 is set smaller than the shortest distance in the projection view between at least one (both in the present embodiment) of the valve stems 47_a_ and 48_a_ of the intake valve 47 and the exhaust valve 48 and the camshaft 34. More specifically, in the present embodiment, if the shortest distance in the projection view between the valve stem 47_a_ of the intake valve 47 and the camshaft 34 is represented by L1, and the shortest distance in the projection view between the first insertion/removal guide section 68 and the camshaft 34 is represented by L2, the shortest distances L1 and L2 are determined so that a relation, L2<L1 is established, and the relative positional relationship between the valve stem 48_a_ of the exhaust valve 48 as well as the second insertion/removal guide section 69 and the camshaft 34 is determined in a similar manner.

At least one, e.g., both, in the present embodiment, of the upper ends of the first second insertion/removal guide sections 68 and 69 is formed in a curved configuration to protrude into the valve-operating chamber 26 between the cylinder head 22 and the head cover 23.

Figure 4:
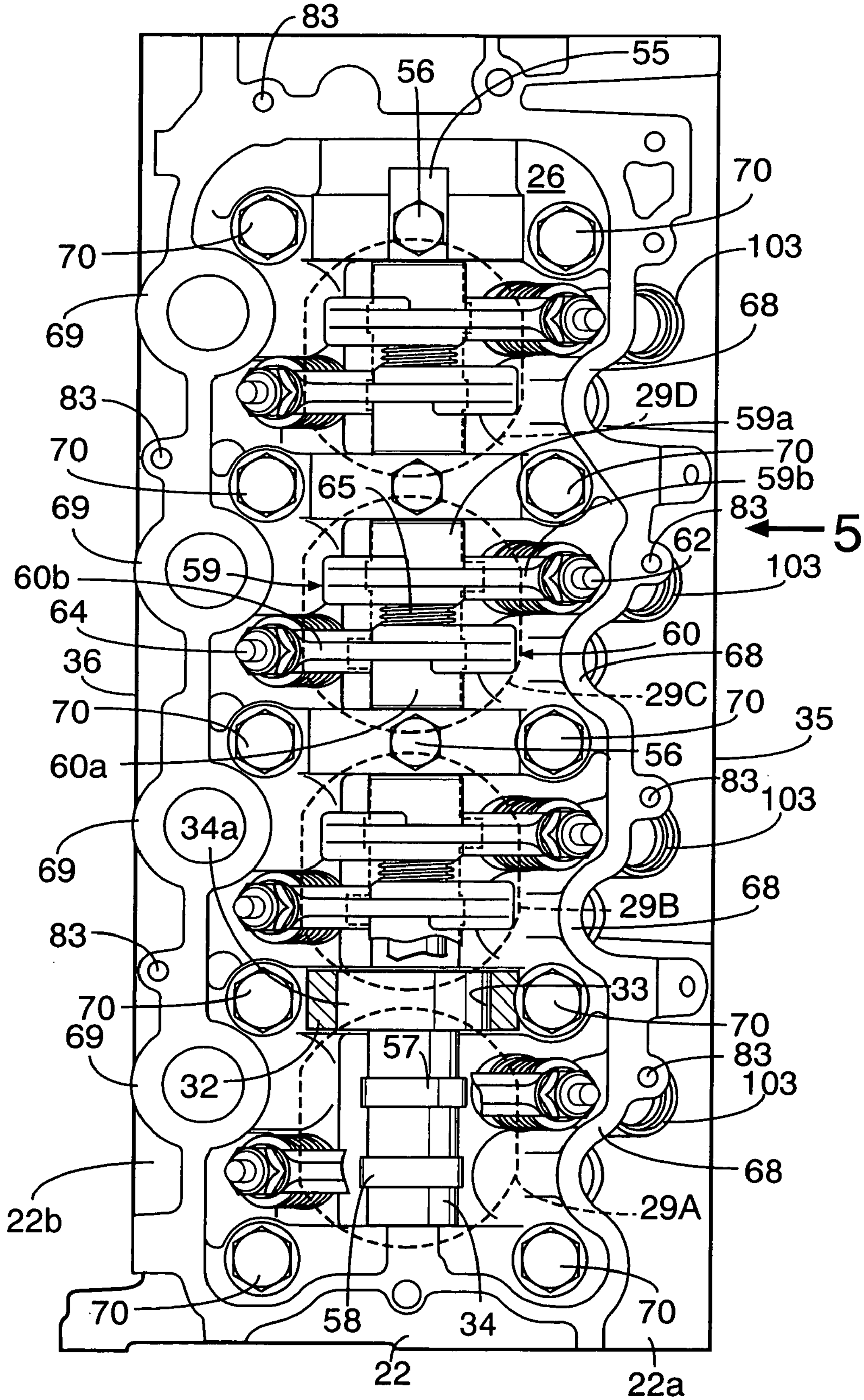
Figure 5:
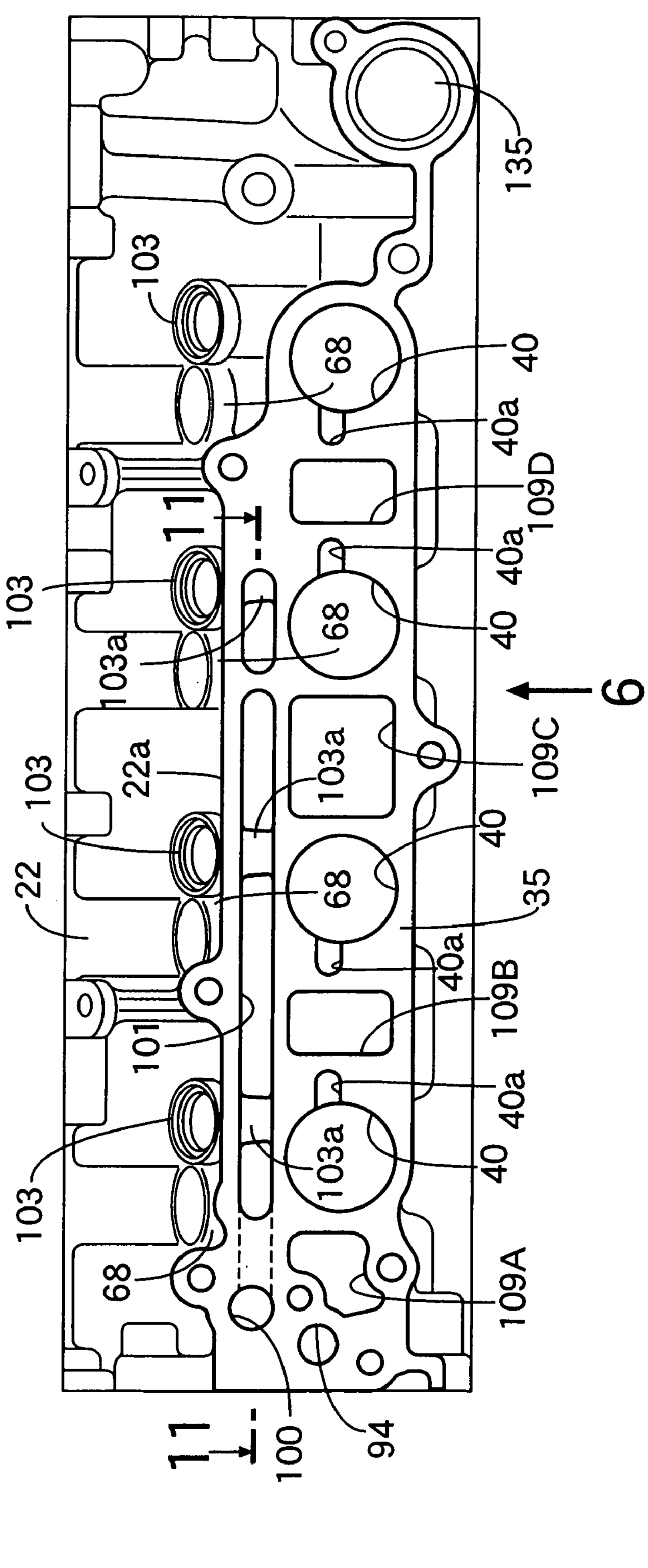
Figure 6:
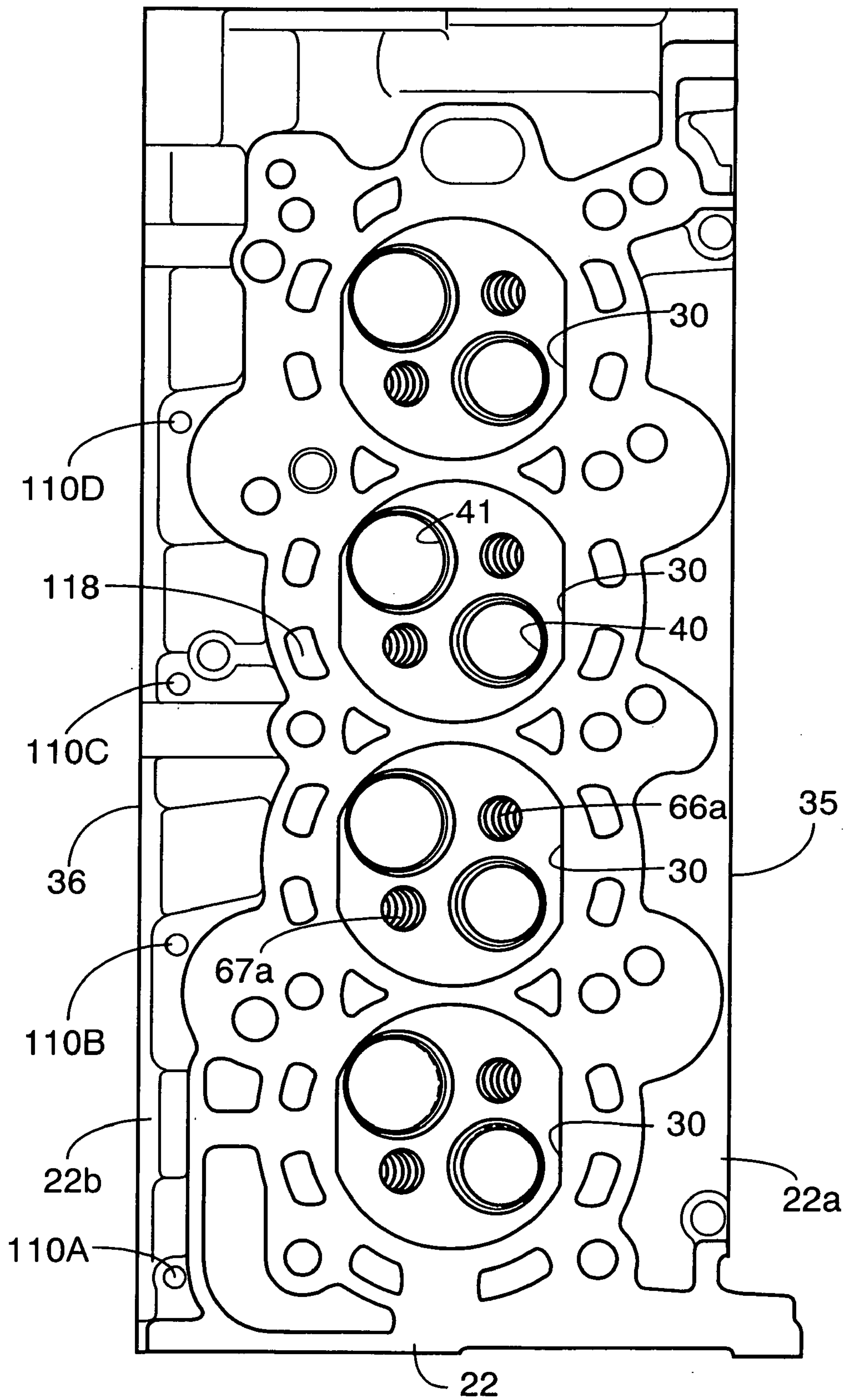

Referring particularly carefully to FIG. 4, the cylinder head 22 is fastened to the cylinder block 21 by head bolts 70 disposed plurality by plurality, e.g., five by five on opposite sides at distances in the axial direction of the camshaft 34. The first and second insertion/removal guide sections 68 and 69 are disposed at least in part between the head bolts 70 and at least one (both in the present embodiment) of the intake valves 47 and the exhaust valves 48 and are disposed effectively by curving at least in part in spaces between the intake and exhaust valves 47 and 48 and the head bolts 70 disposed sideways of the valves 47 and 48. This can contribute to the compactness of the cylinder head 22 in a widthwise direction perpendicular to the axis of the camshaft 34.

At least one of the first and second insertion/removal guide sections 68 and 69 is disposed at least in part between at least one of the intake valves 47 and the exhaust valves 48 and the head bolts 70 adjoining at least one of the intake valves 47 and the exhaust valves 48. In the present embodiment, a portion of the first insertion/removal guide section 68 is disposed between the intake valve 47 and the head bolt 70 adjoining the intake valve 47, and a portion of the second insertion/removal guide section 69 is disposed between the exhaust valve 48 and the head bolt 70 adjoining the exhaust valve 48. Thus, portions of the first and second insertion/removal guide sections 68 and 69 are disposed effectively in the spaces between the intake valves 47 as well as the exhaust valves 48 and the head bolts 70 disposed sideways of the valves 47 and 48. This can contribute to the compactness of the cylinder head 22 in the axial direction of the camshaft 34.

At least one of the first and second insertion/removal guide sections 68 and 69 are disposed at least in part between the shaft bearing portions 32 of the cylinder head 22 and at least one of the intake valves 47 and the exhaust valves 48. In the present embodiment, portions of the first insertion/removal guide sections 68 are disposed between the shaft bearing portions 32 and the intake valves 47, and portions of the second insertion/removal guide sections 69 are disposed between the shaft bearing portions 32 and the exhaust valves 48. With such dispositions, portions of the first insertion/removal guide sections 68 are disposed effectively in the spaces between the intake valves 47 and the shaft bearing portions 32 disposed sideways of the intake valves 47, and portions of the second insertion/removal guide sections 69 are disposed effectively in the spaces between the exhaust valves 48 and the shaft bearing portions 32 disposed sideways of the exhaust valves 48. This can contribute to the further compactness of the cylinder head 22 in the axial direction of the camshaft 34.

Further, upper portions of the first and second insertion/removal guide sections 68 and 69 are formed in a curved manner to protrude toward the valve-operating chamber 26, and such protrusions are disposed at locations corresponding to contact portions of the intake-side cams 57 and the exhaust cams 58 partially immersed in an oil bath 71 (see FIGS. 1 and 2) defined on the cylinder head 22 with the rollers 61 and 63 provided on the intake-side rocker arms 59 and the exhaust-side rocker arms 60.

Figure 2:
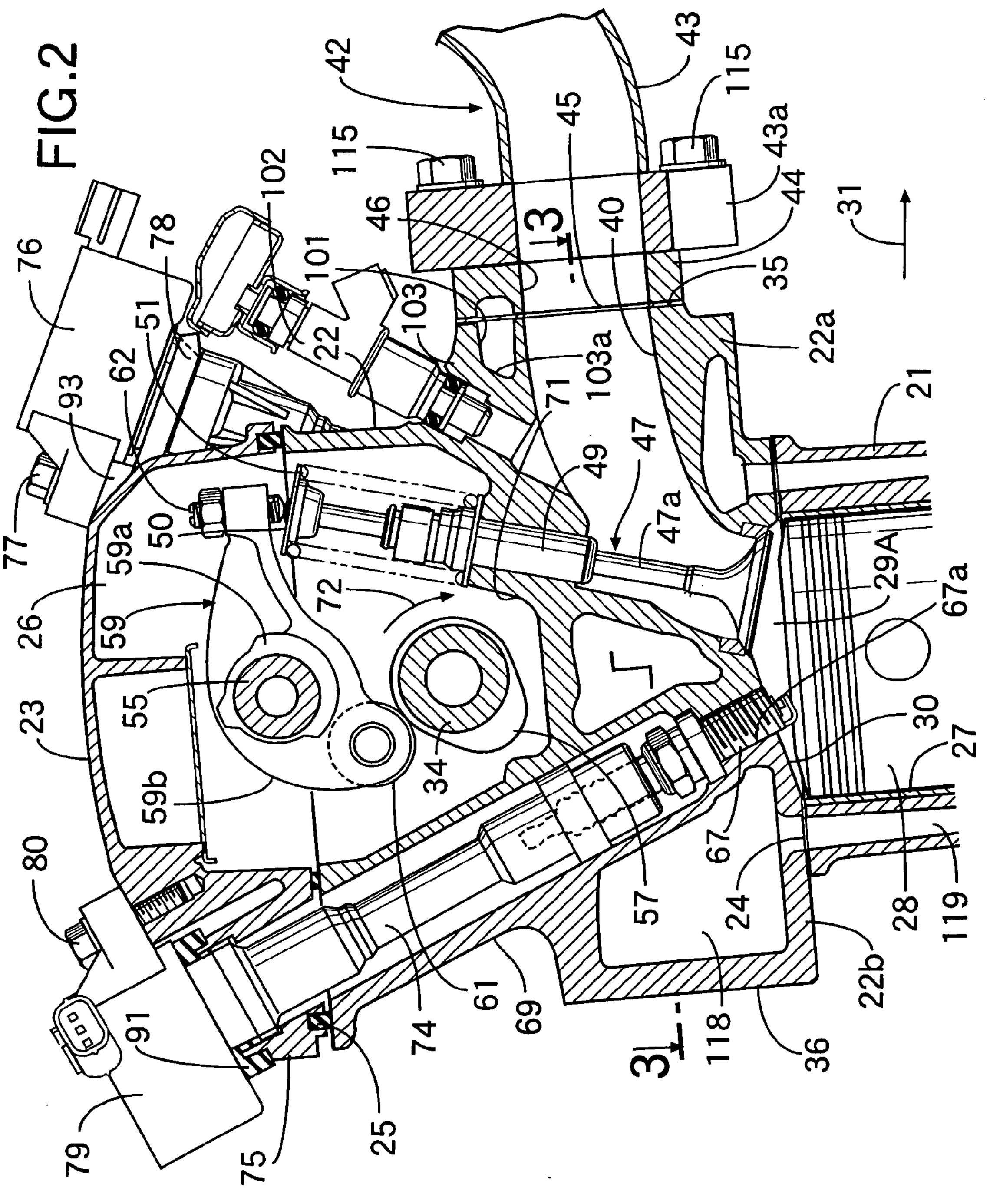
Figure 3:
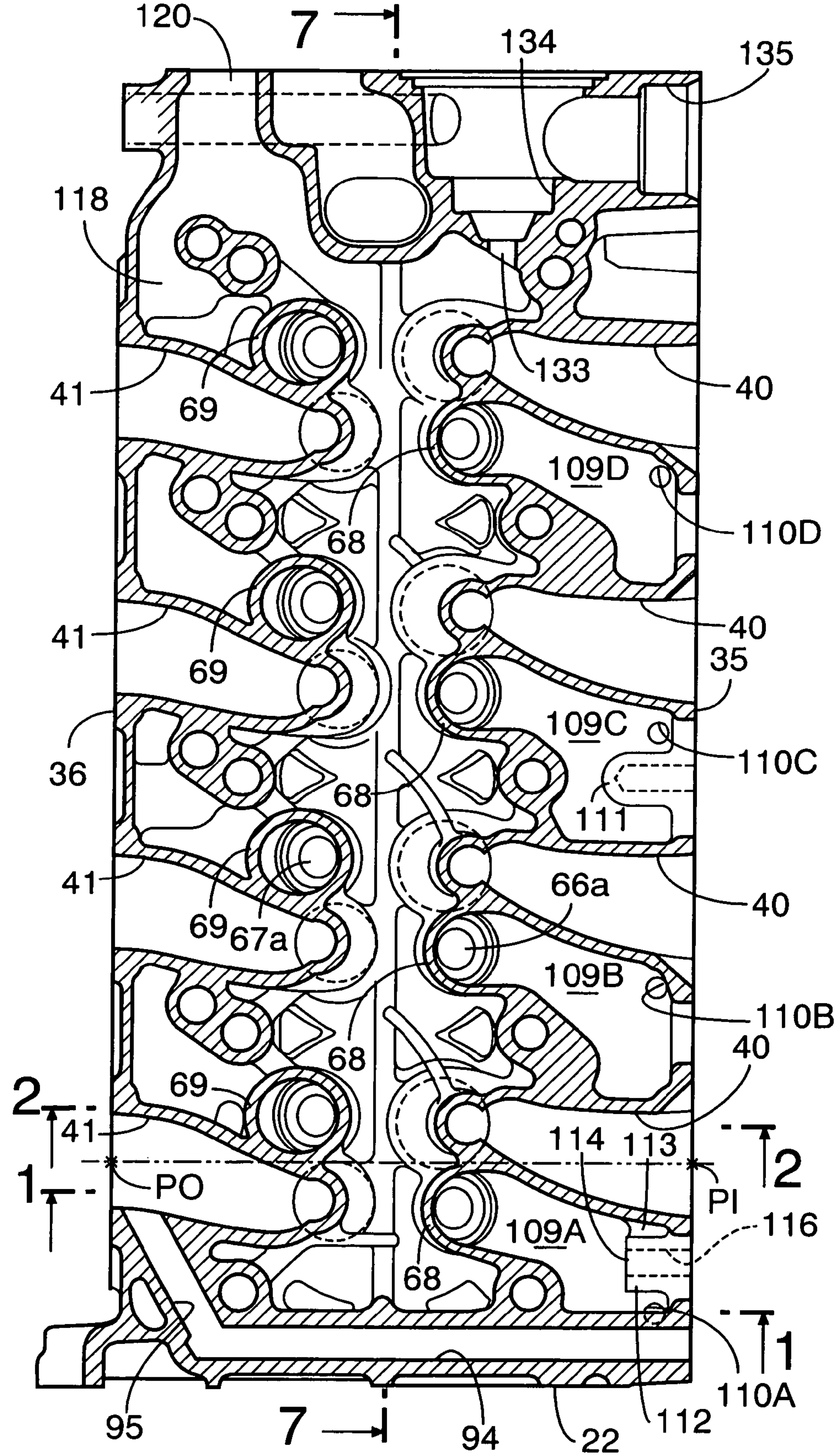

Therefore, the oil in the oil bath 71 is allowed by the exhaust-side cams 58 to collide against the protruding portions of the second insertion/removal guide sections 69 toward the valve-operating chamber 26 in response to the rotation of the camshaft 34 in a rotational direction 72 shown by an arrow in FIGS. 1 and 2, whereby the oil is scattered effectively into the valve-operating chamber 26. Moreover, the protrusions of the first and second insertion/removal guide sections 68 and 69 toward the valve-operating chamber 26 are disposed at locations corresponding to contact portions of the intake-side cams 57 as well as the exhaust-side cams 58 with the rollers 61 of the intake-side rocker arms 59 as well as the rollers 63 of the exhaust-side rocker arms 60 and hence, the oil scattered into the valve-operating chamber 26 is allowed to collide against the protrusions, whereby the oil is supplied efficiently to the contact portions to enable the effective lubrication of the contact portions.

The first and second spark plugs 66 and 67 is mounted at lower ends of first and second bar-shaped plug holders 73 and 74 removably inserted into the first and second insertion/removal guide sections 68 and 69, respectively.

The first insertion/removal guide section 68 has a cylindrical portion 68*a* at its vertically intermediate portion, and the first plug holder 73 is inserted into the first insertion/removal guide section 68 and has, at its intermediate portion, a sealing portion 73*a* which is resiliently brought into contact with the entire inner periphery of the cylindrical portion 68*a*. An upper portion of the first plug holder 73 protrudes from the cylinder head 22. The second plug holder 74 is inserted into the second insertion/removal guide section 69 which is cylindrical. On the other hand, the head cover 23 is provided with cylindrical portions 75 coaxially connected at their lower ends to upper ends of the second insertion/removal guide sections 69 provided in the cylindrical shape on the cylinder head 22, and the second plug holders 74 are inserted into the cylindrical portions 75 above the second insertion/removal guide sections 69. Ring-shaped resilient members 91 for moderating the transmission of the vibration of the engine to the second plug holders 74 are mounted between the second plug holders 74 and the cylindrical portions 75.

Figure 8:
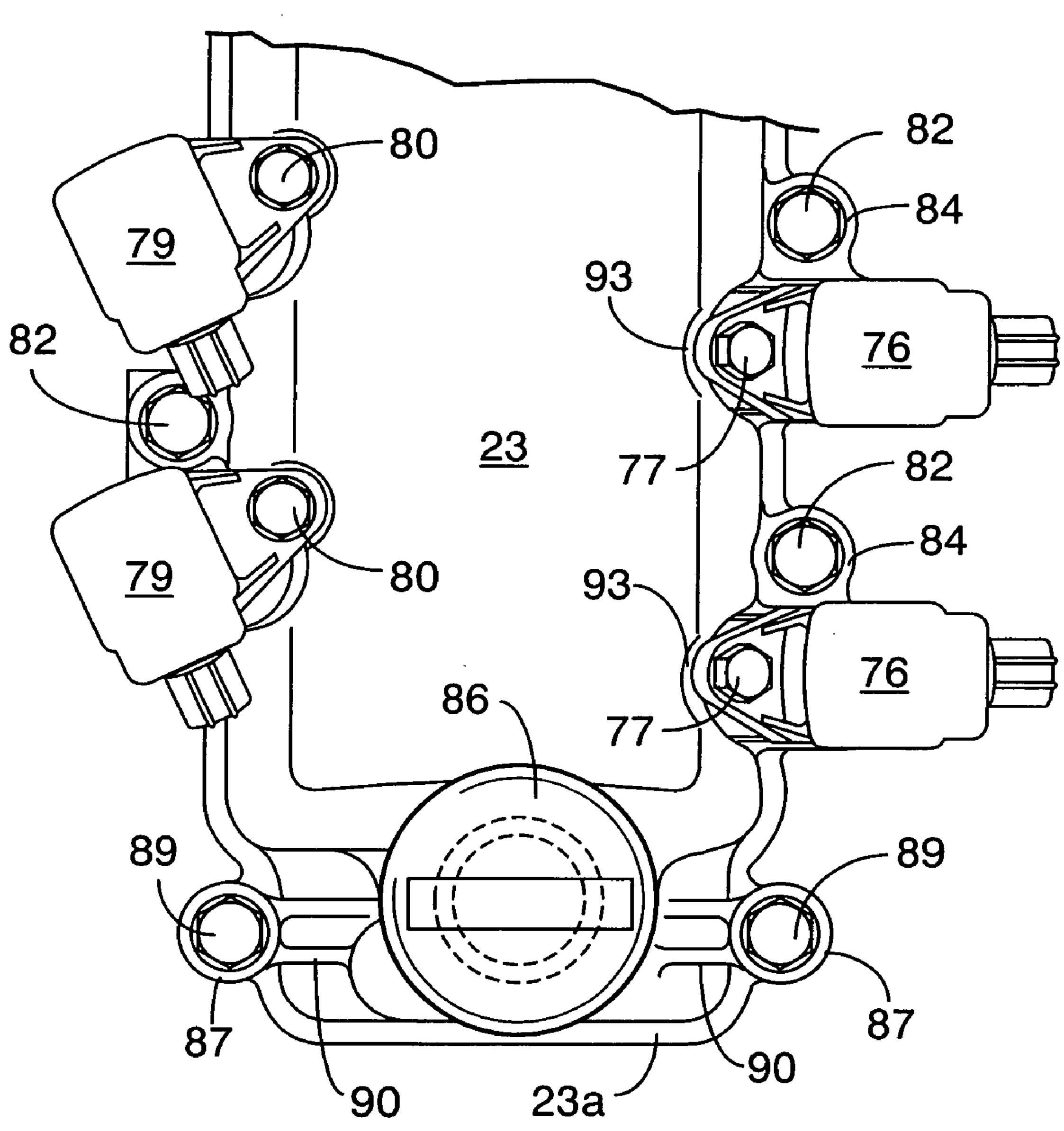
Figure 9:
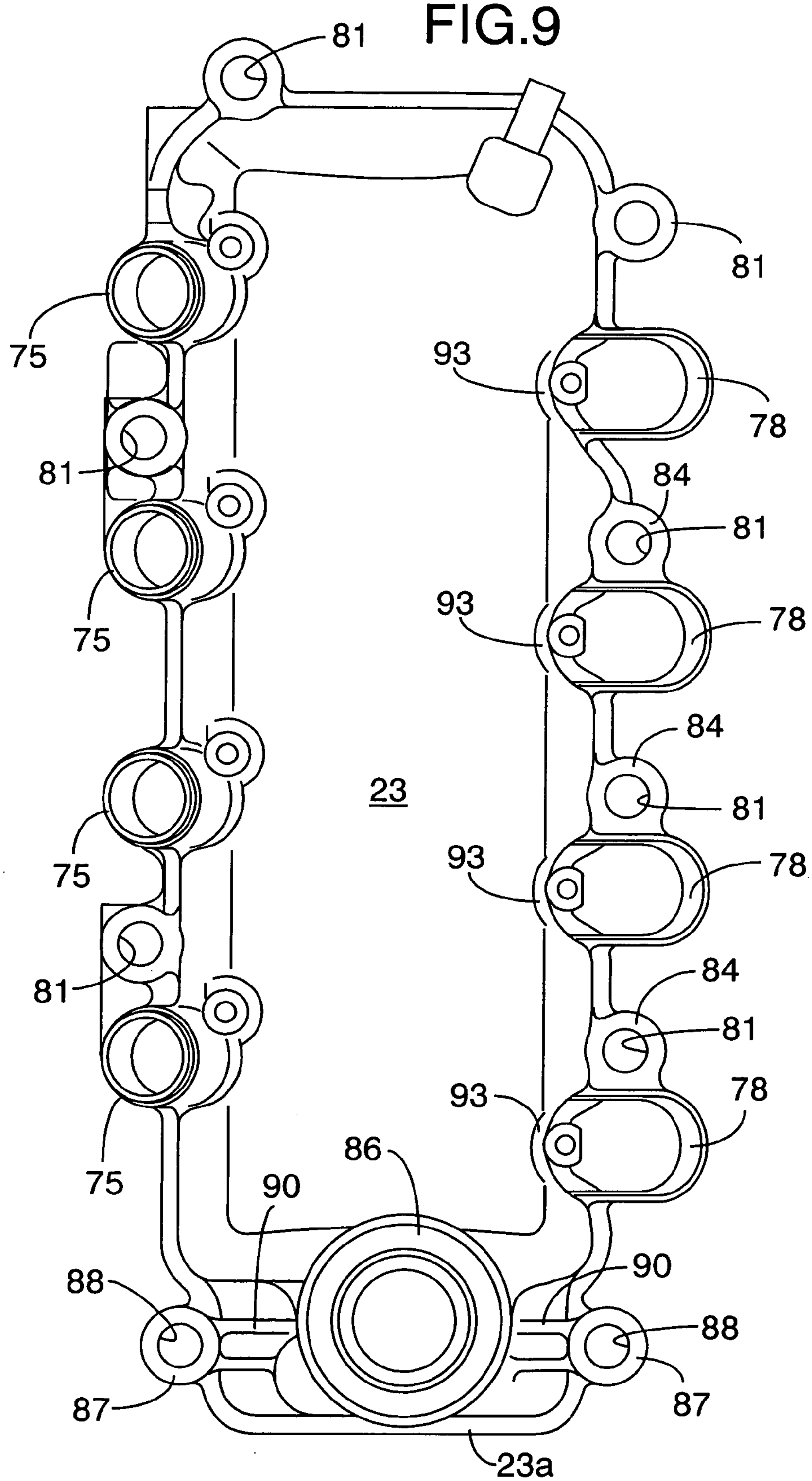

Referring also to FIGS. 8 and 9, ignition coils 76 are connected individually to upper ends of the first plug holders 73 inserted into the first insertion/removal guide sections 68 and protruding upwards from the cylinder head 22, and are fastened to the head cover 23 by coil bolts 77 each provided in correspondence to each of the combustion chambers 29A to 29D.

Upper portions of the first plug holders 73 protrude upwards from the cylinder head 22. In order to inhibit a turning force in a tightening direction of the coil bolts 77 from acting on portions of the first plug holders 73 protruding upwards from the cylinder head 22 to cause a forcible load to be applied to such protrusions, when the ignition coils 76 are fastened to the head cover 23 by the coil bolts 77, detent portions 78 contacting with outer peripheries of the upper ends of the first plug holders 73 are integrally provided on the head cover 23, for example, in a ring shape through which the upper ends of the first plug holders 73 are inserted. Therefore, the ignition coils 76 can be mounted to the head cover 23 by a very simple mounting operation, and it is possible to prevent a forcible load from being applied to the first spark plugs 66, while avoiding an increase in number of parts. In addition, the rigidity of the head cover 23 can be enhanced by the detent portions 78.

Moreover, the coil bolts 77 are threadedly engaged with fastening bosses 93 provided on the head cover 23 inside the detent portions 78 in order to avoid that the size of the head cover 23 is increased for the fastening of the ignition coils 76.

Ring-shaped resilient members 92 are mounted between the upper ends of the first plug holders 73 and the detent portions 78 and hence, the transmission of the vibration of the engine to the ignition coils 76 and 79 can be moderated by the resilient members 91 and 92, and the durability of the ignition coils 76 and 79 can be maintained at a high level.

Further, each of the upper portions of the first insertion/removal guide sections 68 inserted into the first plug holders 73 has an arcuate cross-sectional shape opened forwards in the direction 31 of forward movement of the vehicle in such a manner that the upper portions of the first plug holders 73 are exposed to the outside. Thus, travel wind produced with the forward movement of the vehicle strikes directly against the upper portions of the first plug holders 73, thereby effectively cooling the first plug holders 73.

On the other hand, the ignition coils 79 connected individually to the upper ends of the second plug holders 74 are fastened to the head cover 23 by the coil bolts 80 each provided in correspondence to each of the combustion chambers 29A to 29D. In addition, the upper portions of the second plug holders 74 are inserted into the cylindrical portions 75 of the head cover 23 and hence, a force applied to the upper portions of the second plug holders 74 upon tightening of the coil bolts 80 is received by the cylindrical portions 75. In addition, the second plug holders 74 are covered from the outside with the second insertion/removal guide sections 69 and the cylindrical portions 75 connected to each other in a cylindrical shape, and the cylindrical portions 75 are interposed between an exhaust device (not shown) and the ignition coils 79. Therefore, an adverse affection due to a dissipation of heat from the exhaust device is inhibited as much as possible from being exerted to the second plug holders 74 and the ignition coils 79.

The head cover 23 is fastened to the cylinder head 22 at a plurality of points, e.g., at seven points spaced apart from one another in a circumferential direction thereof, and the bolts 82 inserted through the insertion bores 81 provided in the head cover 23 are threadedly engaged into the threaded bores 83 provided in the upper surface of the cylinder head 22.

Among the insertion bores 81, the bolts 82 and the threaded bores 83 provided at the plurality of points, for example, the insertion bores 81, the bolts 82 and the threaded bores 83 provided at the three points are disposed between the detent portions 78. As a result, it can be ensured that a portion provided on the cylinder head 22 for fastening the head cover 23 to the cylinder head 22 does not protrude sideways from a side of the cylinder head 22 to the utmost. This can contribute to the compactness of the cylinder head 22 and can prevent a forcible load from acting on the second plug holders 73, while providing a reduction in weight of the cylinder head 22.

The three insertion bores 81 disposed between the detent portions 78 are provided in portions 84 to be fastened, which are connected directly to the three detent portions 78 and hence, the rigidities of the portions 84 to be fastened and the detent portions 78 can be increased.

Among the insertion bores 81, the bolts 82 and the threaded bores 83, for example, the insertion bores 81, the bolts 82 and the threaded bores 83 provided at the two points are disposed between the second insertion/removal guide sections 69 which are cylindrical. This also ensures that the portion provided on the cylinder head 22 for fastening the head cover 23 to the cylinder head 22 does not protrude sideways from the side of the cylinder head 22 to the utmost, which can contribute further to the compactness of the cylinder head 22.

The head cover 23 has a bulge 23*a* protruding from the cylinder head 22 at one end thereof in the axial direction of the camshaft 34. The bulge 23*a* is fastened to a chain cover (not shown) which is a cover for covering a power-transmitting mechanism. Integrally provided on the bulge 23*a* are an oil supply tube 86 protruding upwards and detachably closed by an oil filler cap 85, and fastening boss portions 87, 87 disposed on opposite sides of the oil supply tube 86, and bolts 88, 88 inserted respectively through the fastening boss portions 87, 87 are threadedly engaged with the chain cover. Therefore, it is possible to enhance the operability of attaching and detaching the oil filler cap 85 and to increase the fastening rigidities of the head cover 23 and the chain cover by the oil supply tube 86 having a high rigidity.

Moreover, the bulge 23*a* has ribs 90, 90 integrally formed on its upper surface for connecting the oil supply tube 86 and the fastening boss portions 87, 87 to each other, and the rigidities of the oil supply tube 86 and the fastening boss portions 87, 87 are increased by the ribs 90, 90. A first EGR passage 94 is provided in the cylinder head 22 at one end in the direction along the axis of the camshaft 34 to extend in the direction perpendicular to the axis of the camshaft 34. One end of the first EGR passage 94 communicates with the exhaust port 41 in the first combustion chamber 29A through a communication bore 95 provided in the cylinder head 22, and the other end of the first EGR passage 94 opens into the intake-side fastening face 35.

The first EGR passage 94 is disposed at a location where the exhaust port 41 in the first combustion chamber 29A is interposed between the first EGR passage 94 and the second insertion/removal guide section 69 of the first combustion chamber 29A, i.e., the second spark plug 67, and the exhaust port 41 is permitted to communicate with the first EGR passage 94 by the communication bore 95 extending rectilinearly, whereby the structure of communication between the exhaust port 41 and the first EGR passage 94 can be simplified. In addition, the first EGR passage 94 is disposed at a location where the first insertion/removal guide section 68 of the first combustion chamber 29A, i.e., the first spark plug 66 is interposed between the first EGR passage 94 and the intake port 40. Thus, it is possible to inhibit the exertion of an adverse affection due to the heat from the first EGR passage 94 to the air flowing through the intake port 40.

Figure 10:
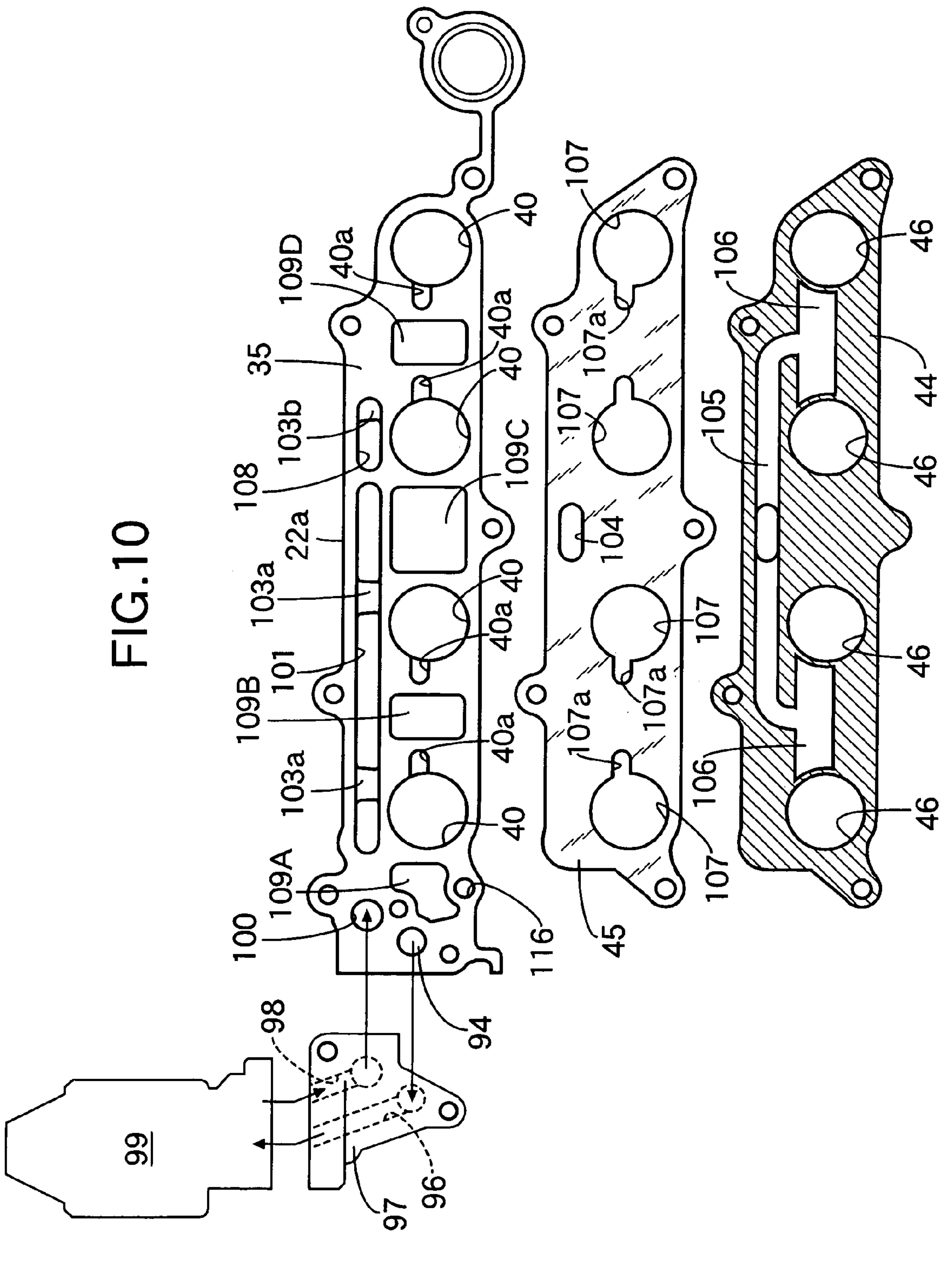

Referring to FIG. 10, a passage member 97 having an inlet-side passage 96 leading to the first EGR passage 94 is fastened to the intake-side fastening face 35 at one end in the axial direction of the camshaft 34. An EGR valve 99 is mounted to the passage member 97 for controlling the flowing of an EGR gas between the inlet-side passage 96 and an outlet-side passage 98 provided in the passage member 97. Namely, the EGR valve 99 for controlling the flowing of the EGR gas is mounted to a sidewall of the cylinder head 22, into which the upstream end of the intake port 40 opens, and the intake port 40 in the first combustion chamber 29A is disposed between the first insertion/removal guide section 68 of the first combustion chamber 29A, i.e., the first spark plug 66 and the EGR valve 99. This also can inhibit the exertion of the adverse affection due to the heat from the EGR valve 99 to the air flowing through the intake port 40 in the first combustion chamber 29A.

Figure 11:
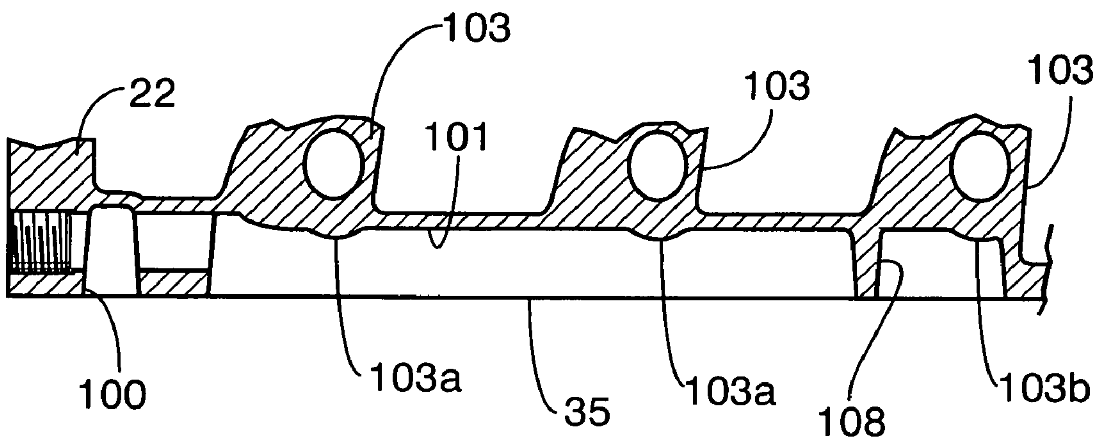

Further, referring also to FIG. 11, the cylinder head 22 is provided, at its portion corresponding to the passage member 97, with a communication bore 100 which opens at its outer end into the intake-side fastening face 35 to lead to the outlet-side passage 98 in the passage member 97, and a second EGR passage 101 leading to an inner end of the communication bore 100. The second EGR passage 101 is defined to extend in parallel to the camshaft 34 from a portion of the cylinder head 22 closer to one end thereof in the axial direction of the camshaft 34 to a substantially central portion of the cylinder head 22 in the axial direction of the camshaft 34, and the major portion of the second EGR passage 101 opens into the intake-side fastening face 35. However, the major portion of the opening of the second EGR passage 101 into the intake-side fastening face 35 is closed by the gasket 45 interposed between the intake-side fastening face 35 and the plate 44.

On the other hand, the protrusion 22*a* of the cylinder head 22 is provided with bosses 103 for mounting fuel injection valves 102 for injecting fuel into the intake ports 40, and the second EGR passage 101 is disposed effectively in a space between the intake port 40 and the fuel injection valve 102 at a location corresponding to the first and second combustion chambers 29A and 29B in order to further contribute to the compactness of the cylinder head 22.

The bosses 103 are provided at lower portions of the first insertion/removal guide sections 68 each having the arcuate cross-sectional shape with at least upper portion opened on the side opposite from the camshaft 34, so that they adjoin one another in the direction along the axis of the camshaft 34. If the fuel injection valves 102 and the first insertion/removal guide sections 68 are disposed as described above, the fuel injection valves 102 can be disposed in more proximity to the first spark plugs 66, while avoiding the interference with the first insertion/removal guide sections 68, thereby contributing to the compactness of the engine.

Moreover, the bosses 103 are provided at the protrusions 22*a* of the cylinder head 22 so as to be integrally connected at no distance to the first insertion/removal guide sections 68 and hence, the rigidity of the bosses 103 can be enhanced.

Further, the second insertion/removal guide sections 69, the intake-side rocker arms 59, the intake valves 47 and the bosses 103 are arranged substantially side by side in the same plane perpendicular to the axis of the camshaft 34. Such disposition enables the further compactness of the cylinder head 22.

The second EGR passage 101 extends in parallel to the axis of the camshaft 34 in the vicinity of the fuel injection valves 102 corresponding to the first and second combustion chambers 29A and 29B, and a portion of the boss 103 provided on the cylinder head 22 in order to mount the fuel injection valve 102 at a location corresponding to each of the first and second combustion chambers 29A and 29B intrudes as an intruding portion 103*a* into the second EGR passage 101.

On the other hand, the cylinder head 22 is provided, for the purpose of reduction in weight, with a recess 108 which opens into the intake-side fastening face 35 on an extension of an inner end of the second EGR passage 101 and closed by the gasket 45, and a portion of the boss 103 provided on the cylinder head 22 in order to mount the fuel injection valve 102 at a location corresponding to the third combustion chamber 29C intrudes into the recess 108 as an intruding portion 103*b* in order to ensure a wall thickness.

Referring particularly carefully to FIG. 10, a communication passage 104 is provided in the gasket 45 abutting against the intake-side fastening face 35 and leads to the inner end of the second EGR passage 101. Provided in a surface, adjacent the gasket 45, of the plate 44 interposing the gasket 45 between the surface and the intake-side fastening face 35 are a common groove 105 extending in both of leftward and rightward directions with its central portion leading to the communication passage 104, and branch grooves 106, 106 leading to opposite ends of the common groove 105. One end of the common groove 105 is set at a location corresponding to between the intake ports 40, 40 in the first and second combustion chambers 29A and 29B, and the other end of the common groove 105 is set at a location corresponding to between the intake ports 40, 40 in the third and fourth combustion chambers 29C and 29D. One of the branch grooves 106 is defined to extend from the one end of the common groove 105 toward the intake ports

40, 40 in the first and second combustion chambers 29A and 29B, and the other branch groove 106 is defined to extend from the other end of the common groove 105 toward the intake ports 40, 40 in the third and fourth combustion chambers 29C and 29D.

Moreover, a portion of the common groove 105 excluding a portion corresponding to the communication passage 104 as well as major portions of the branch grooves 106, 106 are occluded by the gasket 45 interposed between the intake-side fastening face 35 and the plate 44, and passages 107 are provided in the gasket 45 to individually lead to the intake ports 40 so as to have notches 107*a* leading to tip ends of the branch grooves 106, 106 and connected to the passages 107. Notches 40*a* leading to the notches 107*a* are provided at ends of the intake ports 40 opening into the intake-side fastening face 35 so as to be connected to the intake ports 40.

Thus, the EGR gas guided from the exhaust port 41 in the first combustion chamber 29A via the communication bore 95, the first EGR passage 94, the inlet-side passage 96, the EGR valve 99, the outlet-side passage 98 and the communication bore 100 to the second EGR passage 101 is guided from the communication passage 104 in the gasket 45 to the common groove 105 and further diverted into the pair of branch grooves 106, 106 and dispensed from the notches 107*a* and 40*a* to the intake ports 40 in the combustion chambers 29A to 29D.

Spark plug chambers 109A, 109B, 109C and 109D are defined in the cylinder head 22 in correspondence to the combustion chambers 29A, 29B, 29C and 29D with a portion of each of the first spark plugs 66 exposed thereto, so as to be disposed partially at the protrusion 22*a* of the cylinder head 22 and open into the intake-side fastening face 35. Openings of the spark plug chambers 109A, 109B, 109C and 109D into the intake-side fastening face 35 are closed by the gasket 45. Moreover, spark plug chambers 109A and 109B are defined in the cylinder head 22 so as to be interposed between the combustion chambers 29A and 29B and the second EGR passage 101.

It should be noted here that the first spark plug 66 is mounted at the lower end of the first plug holder 73 inserted into the first insertion/removal guide section 68 with the sealing portion 73*a* resiliently brought into contact with the intermediate cylindrical portion 68*a* of the first insertion/removal guide section 68, but a complete sealing by the sealing portion 73*a* cannot be achieved, and it is difficult to avoid the entrance of water from between the sealing portion 73*a* and the cylindrical portion 68*a* into each of the spark plug chambers 109A, 109B, 109C and 109D.

Therefore, drainage bores 110A, 110B, 110C and 110D for draining the water entering into each of the spark plug chambers 109A, 109B, 109C and 109D are provided in the protrusion 22*a* of the cylinder head 22 in such a manner that one ends thereof open into lower ends of the spark plug chambers 109A, 109B, 109C and 109D and the other ends thereof open into the outer surface of the lower portion of the protrusion 22*a*.

A pouch hole-shaped fastening boss 111 for fastening the intake device 42 to the protrusion 22*a* by one of a plurality of fastening bolts 115 is provided on the cylinder head 22 at a location corresponding to the third combustion chamber 29C to intrude into a lower portion of the spark plug chamber 109C. Moreover, the position of the drainage bore 110C is determined, so that one end thereof opens into a lower portion of the spark plug chamber 109C between the spark plug 66 and the fastening boss 111 in the direction along the axis of the camshaft 34.

With the dispositions of the fastening boss 111 and the drainage bore 110C, it is possible to avoid an increase in size of the cylinder head 22. More specifically, when the fastening boss is disposed at a location offset from the spark plug chamber 109C, it is impossible to avoid an increase in size of the cylinder head, but the increase in size of the cylinder head can be avoided by provision of the fastening boss 111 intruding into the lower portion of the spark plug chamber 109C. Moreover, the water entering into the spark plug chamber 109C from around the first spark plug 66 can be guided to the drainage bore 110C, so as not to be obstructed by the fastening boss 111.

A fastening boss 112 for fastening the intake device 42 to the protrusion 22*a* is provided on the cylinder head 22 at a location corresponding to the first combustion chamber 29A to intrude into the lower portion of the spark plug chamber 109C. Moreover, one end of the drainage bore 110A opens into a lower portion of the spark plug chamber 109A at a location where the fastening boss 112 is interposed between the drainage bore 110A and the first spark plug 66 in the direction along the axis of the camshaft 34, and a guide wall 113 for guiding the water entering around the first spark plug 66 toward the drainage bore 110A is provided between an inner wall of the spark plug chamber 109A and the fastening boss 112.

Even with such dispositions of the fastening boss 112, the drainage bore 110C and the guide wall 113, the increase in size of the cylinder head 22 can be avoided, and the water entering into the spark plug chamber 109A from around the first spark plug 66 can be guided by the guide wall 113 toward the drainage bore 110A so as not to be obstructed by the fastening boss 112. In addition, the rigidity of the fastening boss 112 can be increased by the guide wall 113.

Further, the fastening boss 112 and the guide wall 113 are positioned at a lower portion of an inner surface of the spark plug chamber 109A on the side of the projecting end of the protrusion 22*a*, i.e., on the side of the intake-side fastening face 35 to form a flat surface 114 which is parallel to the camshaft 34, and a threaded bore 116 is provided between the intake-side fastening face 35 and the flat surface 114, so that a fastening bolt 115 is threadedly engaged into the threaded bore 116.

Therefore, the water entering into the spark plug chamber 109A from around the first spark plug 66 can be guided by the flat surface 114 toward the drainage bore 110A so as not to be obstructed by a fastening portion of the fastening bolt 115.

Figure 12:
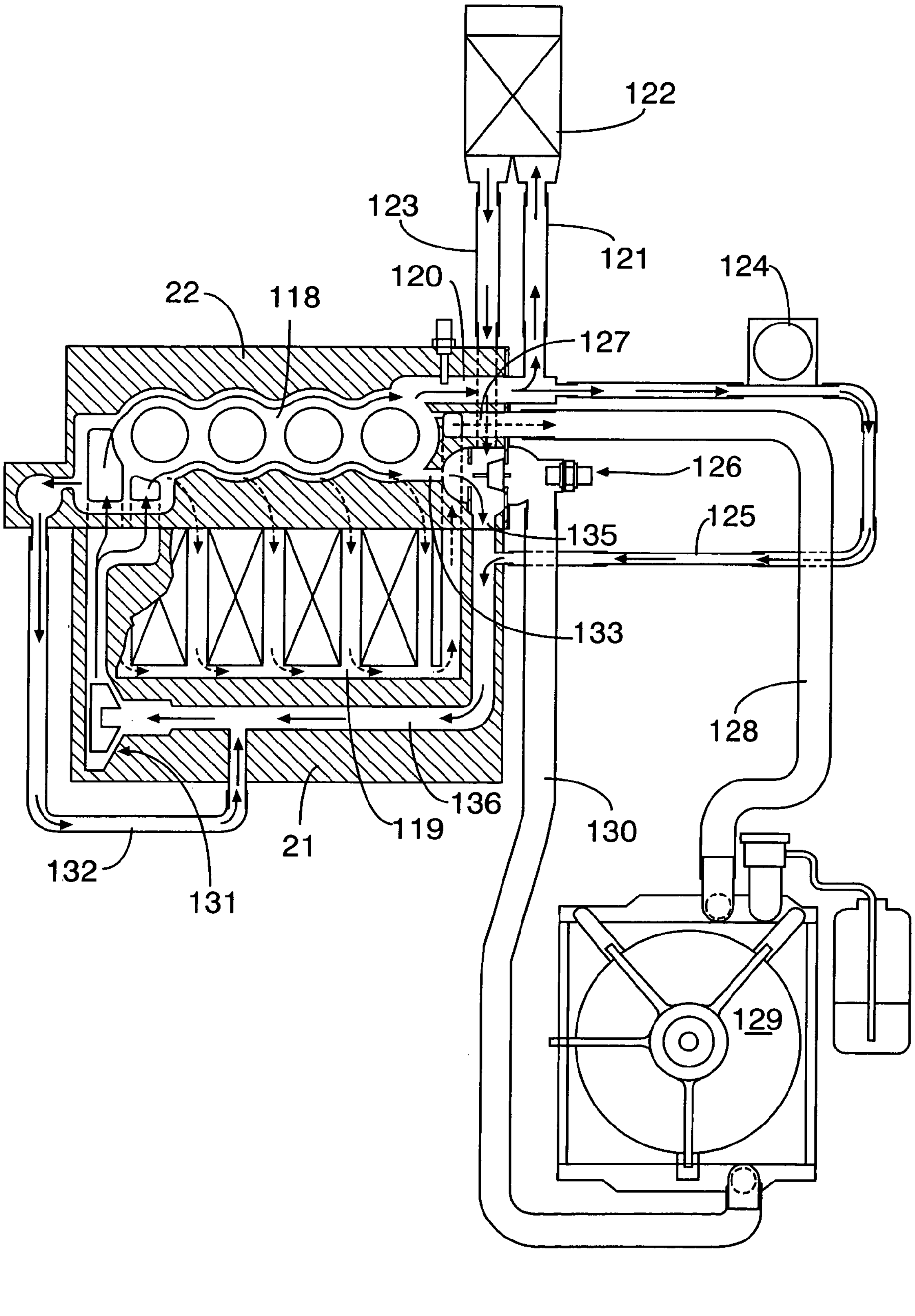
Figure 13:
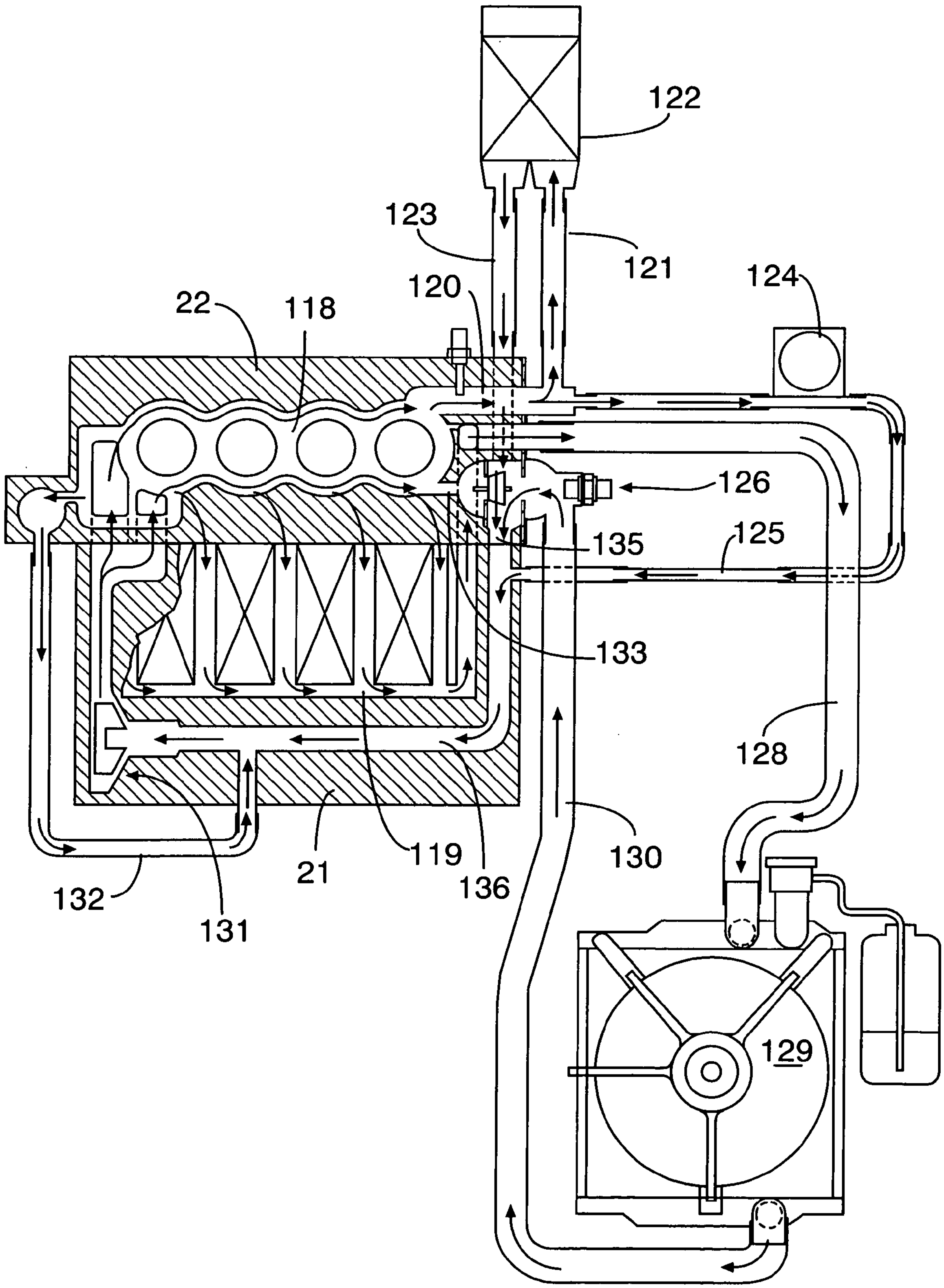

Referring also to FIGS. 12 and 13, a head-side water jacket 118 is provided in the cylinder head 22 to lead to a block- side water jacket 119 provided in the cylinder block 21, and a port 120 leading to the head-side water jacket 118 on the side of the axially other end of the camshaft 34 is connected to a heater core 122 through a line 121. A thermostat 126 is mounted in a mounting recess 134 (see FIG. 3) provided in the cylinder head 22 on the axially other end of the camshaft 34. The heater core 122 is connected to the thermostat 126 through a line 123, and the head-side water jacket 118 within the cylinder head 22 is also connected to the thermostat 126 through a bypass passage 133.

A line 125 is connected at one end to the port 120, and after warm water is supplied through an intermediate portion of the line 125 to an auxiliary such as a throttle body 124, the line 125 is connected to a line 136. The line 136 is connected at one end to a port 135 provided in the cylinder head 22 to lead to an outlet of the thermostat 126, and at the other end to a suction side of a water pump 131. A line 132 for guiding a portion of cooling water from the head-side water jacket 118 in the cylinder head 22 is also connected to the suction side of the water pump 131. A discharge side of the water pump 131 is connected to the head-side water jacket 118 in the cylinder head 22.

A port 127 is provided in the cylinder head 22 to lead to the block-side water jacket 119 in the cylinder block 21. The port 127 is connected to an inlet of a radiator 129 through a line 128, and an outlet of the radiator 129 is connected to the thermostat 126 through a line 130.

In such a cooling water circuit, the thermostat 126 disconnects the line 136 and the line 130 from each other and permits the line 123 and the bypass passage 133 to communicate with the line 136, when the engine is cold, whereby the major portion of the cooling water supplied from the water pump 131 to the head-side water jacket 118 is fed to the heater core 122 and the auxiliary such as the throttle body 124, as shown by a solid line arrow in FIG. 12, but the cooling water cannot be supplied to the radiator 129.

On the other hand, when the engine is hot, the thermostat 126 disconnects the bypass passage 133 and the line 130 from each other and permits the lines 123 and 130 to communicate with the line 136, whereby the cooling water supplied from the water pump 131 to the head-side water jacket 118 is fed to the heater core 122 and the auxiliary such as the throttle body 124 and to the block-side water jacket 119, as shown by a solid line arrow in FIG. 13. The cooling water cooled by feeding thereof from the block-side water jacket 119 to the radiator 129 is drawn into the water pump 131.

The operation of this embodiment will be described below. The single rocker shaft 55, on which the intake-side rocker arm 59 moved following the intake-side cam 57 provided on the camshaft 34 to drive the intake valve 47 and the exhaust-side rocker arm 60 moved following the exhaust-side cam 58 provided on the camshaft 34 to drive the exhaust valve 48 are commonly carried, is fixedly disposed in the cylinder head 22 above the camshaft 34. The first insertion/removal guide section 68 for guiding the insertion and removal of the first spark plug 66 and the intake valve 47 are disposed so as to be superposed one on another at least partially in the view of projection onto the plane perpendicular to the axis of the camshaft 34, and the second insertion/removal guide section 69 for guiding the insertion and removal of the second spark plug 67 and the exhaust valve 48 are disposed so as to be superposed one on another at least partially in the view of projection onto the plane.

Therefore, the intake valve 47 and the first insertion/removal guide section 68 as well as the exhaust valve 48 and the second insertion/removal guide section 69 can be disposed at the locations closer to the camshaft 34, and the width of the cylinder head 22 in the direction perpendicular to the axis of the camshaft 34 can be set at a small value, as compared with the conventional SOHC-type engine including a pair of rocker shafts.

The shortest distance L2 in the projection view between at least one of the first and second insertion/removal guide sections 68 and 69 and the camshaft 34 is set smaller than the shortest distance L1 in the projection view between at least one of the valve stems 47*a* and 48*a* of the intake valve 47 and the exhaust valve 48 and the camshaft 34. Therefore, at least one of the first and second insertion/removal guide sections 68 and 69 can be disposed in more proximity to the camshaft 34, whereby the width of the cylinder head in the direction perpendicular to the axis of the camshaft 34 can be set at a small value. In addition, by setting the shortest distance L2 between the first and second insertion/removal guide sections 68 and 69 and the camshaft 34 smaller than the shortest distance L1 between the valve stems 47*a* and 48*a* of the intake valve 47 and the exhaust valve 48 and the camshaft 34 as in the embodiment, both of the first and second insertion/removal guide sections 68 and 69 can be disposed in more proximity to the camshaft 34, whereby the width of the cylinder head 22 in the direction perpendicular to the axis of the camshaft 34 can be set at a further small value.

Additionally, since the upper ends of the first and second insertion/removal guide sections 68 and 69 integral with the cylinder head 22 are formed in a curved manner to protrude into the valve-operating chamber 26, the amount of protrusion of the upper ends of the first and second insertion/removal guide sections 68 and 69 from the side of the cylinder head 22 can be suppressed to a small level, thereby contributing to the compactness of the cylinder head 22 and enhancing the rigidity of the upper end of the sidewall of the cylinder head 22. Moreover, the inclination of the first and second spark plugs 66 and 67 can be suppressed to a small level to enhance the ignitability.

Further, the boss 103 for mounting the fuel injection valve 102 for injecting the fuel into the intake port 40 is provided on the cylinder head 22, and the second EGR passage 101 for guiding the EGR gas is provided in the cylinder head 22 to extend in parallel to the axis of the camshaft 34 in the vicinity of the fuel injection valve 102 with a portion of the boss 103 intruding into the EGR passage 101. Therefore, the second EGR passage 101 can be provided in the cylinder head 22 in the vicinity of the fuel injection valve 102, while ensuring the wall thickness of the boss 103 on the side of the second EGR passage 101. The second EGR passage 101 can be disposed in the vicinity of the fuel injection valve 102, while ensuring the rigidity of the boss 103 and inhibiting an adverse affection due to the high-temperature EGR gas flowing through the second EGR passage 101 from being exerted to the fuel injection valve 102, thereby achieving the compactness of the cylinder head 22.

The position PI of the central portion of the upstream end of the intake port 40 provided in the cylinder head 22 and the position PO of the central portion of the downstream end of the exhaust port 41 are determined to coincide with each other in the direction along the axis of the camshaft 34 and hence, the distance between the cylinders of the multi-cylinder engine can be set to be short, and the size of the cylinder head 22 in the direction along the axis of the camshaft 34 can be reduced.

Further, the cylinder head 22 is integrally provided with the protrusion 22*a* projecting outwards from the cylinder block 21, and the spark plug chambers 109A, 109B, 109C and 109D corresponding to the combustion chambers 29A, 29B, 29C and 29D with a portion of each of the first spark plugs 66 facing the corresponding combustion chamber are defined in the cylinder head 22 in such a manner that a portion of each of the spark plug chambers is disposed in the protrusion 22*a*. Therefore, the volume of each of the spark plug chambers 109A to 109D can be set at relatively large value to provide a reduction in weight of the cylinder head 22.

Moreover, the cylinder head 22 is provided with the drainage bores 110A, 110B, 110C and 110D, one end of each of which opens into the lower portion of each of the spark plug chambers 109A, 109B, 109C and 109D and the other end of each of which opens into the outer surface of the lower portion of the protrusion 22*a*, i.e., the outer surface of the lower portion of the cylinder head 22 outside the cylinder head 21. Therefore, the water entering into the spark plug chambers 109A to 109D can be reliably discharged through the drainage bores 110A to 110D shortened in length and simplified.

Although the embodiment of the present invention has been described, it will be understood that the present invention is not limited to the above-described embodiment, and various modifications in design may be made without departing from the scope of the invention defined in claims.

What is claimed is:

1. An SOHC-type engine comprising first and second insertion/removal guide sections (68, 69) for guiding the insertion and removal of first and second spark plugs (66, 67), respectively, provided on a cylinder head (22) including an intake valve (47) and a first spark plug (67) disposed therein and arranged along an axis of a camshaft (34), and an exhaust valve (48) and a second spark plug (67) disposed therein and arranged along the axis of said camshaft (34), wherein a single rocker shaft (55) is disposed above said camshaft (34); and an intake-side rocker arm (59) pivotally following an intake-side cam (57) provided on said camshaft (34) to drive the intake valve (47) and an exhaust-side rocker arm (60) pivotally following an exhaust-side cam (58) provided on said camshaft (34) to drive the exhaust valve (48) carried commonly on said rocker shaft (55), wherein said first insertion/removal guide section (68) and the intake valve (47) are disposed so as to be superposed one on another at least partially in a view of projection onto a plane perpendicular to the axis of said camshaft (34), and said second insertion/removal guide section (69) and the exhaust valve (48) are disposed so as to be superposed one on another at least partially in a view of projection onto said plane.

2. An SOHC-type engine according to claim 1, wherein the shortest distance in said projection view between at least one of said first and second insertion/removal guide sections (68, 69) and said camshaft (34) is set smaller than the shortest distance in said projection view between at least one of valve stems **(47*a*, 48*a*) of said intake and exhaust valves (47, 48) and said camshaft (34)**.

3. An SOHC-type engine according to claim 1, wherein the shortest distance in said projection view between said first insertion/removal guide section (68) and said camshaft (34) is set smaller than the shortest distance in said projection view between a valve stem **(47*a*) of the intake valve (47) and said camshaft (34), and the shortest distance in said projection view between said second insertion/removal guide section (69) and said camshaft (34) is set smaller than the shortest distance in said projection view between a valve stem (48*a*) of the exhaust valve (48) and said camshaft (34)**.

4. An SOHC-type engine according to any of claims 1 to 3, wherein at least one of upper ends of said first and second insertion/removal guide sections (68, 69) is formed in a curved manner to protrude into a valve-operating chamber (26) defined between said cylinder head (22) and a head cover (23) coupled to said cylinder head (22).

5. An SOHC-type engine according to any of claims 1 to 3, wherein at least an upper portion of said first insertion/removal guide section (68) is formed to have an arcuate cross-sectional shape opened in a direction opposite from said camshaft (34).

6. An SOHC-type engine according to any of claims 1 to 3, wherein at least one of said first and second insertion/removal guide sections (68, 69) is disposed at least partially between each of head bolts (70) for fastening said cylinder head (22) to a cylinder block (21) at locations spaced apart from one another along the axis of said camshaft (34) and at least one of said intake and exhaust valves (47, 48).

7. An SOHC-type engine according to any of claims 1 to 3, wherein at least one of said first and second insertion/removal guide sections (68, 69) is disposed at least partially between a shaft bearing portion (32) provided on said cylinder head (22) to carry said camshaft (34) thereon for rotation and at least one of said intake and exhaust valves (47, 48).

8. An SOHC-type engine according to any of claims 1 to 3, wherein said first and second insertion/removal guide sections (68, 69) are formed to protrude toward said valve-operating chamber (26) at locations corresponding to contact potions of said intake-side and exhaust-side cams (57, 58) immersed partially in an oil bath (71) defined on said cylinder head (22) with said intake-side and exhaust-side rocker arms (59, 60).

9. An SOHC-type engine according to claim 1, wherein at least an upper end of said second insertion/removal guide section (69) is formed into a cylindrical shape, and bolts (82) for fastening a head cover (23) to said cylinder head (22) are disposed between said second insertion/removal guide sections (69) individually corresponding to a plurality of combustion chambers (29A, 29B, 29C and 29D).

10. An SOHC-type engine according to claim 1, wherein a first plug holder (73) connected to the first spark plug (66) inserted into said first insertion/removal guide section (68) protrude from said cylinder head (22); an ignition coil (76) connected to an upper end of said first plug holder (73) are fastened to a head cover (23) coupled to said cylinder head (22) by a single coil bolt (77); and a detent portion (78) are integrally provided on said head cover (23) to come into contact with the upper end of said first plug holder (73) in order to receive a load around the axis of said coil bolt (77) acting on a protrusion of said first plug holder (73) from said cylinder head (22) during tightening of said coil bolt (77).

11. An SOHC-type engine according to claim 10, wherein bolts (82) for fastening said head cover (23) to said cylinder head (22) are disposed between said detent portions (78) corresponding individually to a plurality of combustion chambers (29A to 29D).

12. An SOHC-type engine according to claim 10 or 11, wherein each of said detent portions (78) is formed into a ring shape.

13. An SOHC-type engine according to any of claim 10 or 11, wherein a fastening boss (93) for fastening said ignition coil (76) is provided on said head cover (23) inside said detent portion (78).

14. An SOHC-type engine according to any of claim 10 or 11, wherein a resilient member (92) is mounted between said detent portion (78) and said first plug holder (73).

15. An SOHC-type engine according to claim 1, wherein upper end faces of said first and second insertion/removal guide sections (68, 69) are formed in the same plane, and a head cover (23) is coupled to said upper end faces of the first and second insertion/removal guide sections (68, 69).

16. An SOHC-type engine according to claim 1, wherein an upper portion of said first insertion/removal guide section (68), into which said first plug holder (73) connected to said first spark plug (66) is inserted, is formed to have an arcuate cross-sectional shape opened forwards in a direction (31) of forward movement of the vehicle.

17. An SOHC-type engine according to claim 1, wherein an upper portion of each of said first insertion/removal guide section (68) is formed to have an arcuate cross-sectional shape opened in direction opposite from said camshaft (34), and a boss (103) for mounting a fuel injection valve (102) is provided on said cylinder head (22) at a location adjoining a lower portion of said first insertion/removal guide section (68) in a direction along the axis of said camshaft (34).

18. An SOHC-type engine according to claim 1, wherein a boss (103) for mounting a fuel injection valve (102) is provided on the cylinder head (22) so as to be integrally connected to said first insertion/removal guide sections (68).

19. An SOHC-type engine according to claim 1, wherein said second insertion/removal guide section (69), an intake-side rocker arm (59), said intake valve (47) and a boss (103) provided on said cylinder head (22) to mount a fuel injection valve (102) are disposed substantially side by side on the same plane perpendicular to the axis of said camshaft (34).

20. An SOHC-type engine according to claim 1, wherein a protrusion **(22*a*) is integrally provided on said cylinder head (22) to project outwards and sideways from a cylinder block (21); a spark plug chamber (109A, 109B, 109C, 109D) faced by a portion of said first spark plug (66) is defined in the cylinder head (22) in such a manner that a portion of said spark plug chamber is disposed on said protrusion (22*a*); and a drainage bore (110A, HOB, HOC, HOD) is provided in said protrusion (22*a*), so that one end thereof opens into a lower portion of said spark plug chamber (109A to 109D) and the other end thereof opens into an outer surface of a lower portion of said protrusion (22*a*)**.

* * * * *